US012335319B2

(12) United States Patent
Zhang

(10) Patent No.: US 12,335,319 B2
(45) Date of Patent: Jun. 17, 2025

(54) METHOD AND APPARATUS FOR DETERMINING SECURITY PROTECTION MODE

(71) Applicant: Huawei Technologies Co., Ltd., Shenzhen (CN)

(72) Inventor: Bo Zhang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 278 days.

(21) Appl. No.: 17/346,961

(22) Filed: Jun. 14, 2021

(65) Prior Publication Data
US 2021/0306381 A1 Sep. 30, 2021

Related U.S. Application Data

(63) Continuation of application No. PCT/CN2020/100310, filed on Jul. 5, 2020.

(30) Foreign Application Priority Data

Aug. 9, 2019 (CN) .......................... 201910736599.8
Nov. 8, 2019 (CN) .......................... 201911088795.5

(51) Int. Cl.
H04L 9/40 (2022.01)
H04W 12/30 (2021.01)
(Continued)

(52) U.S. Cl.
CPC .......... *H04L 63/205* (2013.01); *H04L 63/105* (2013.01); *H04W 12/30* (2021.01); *H04W 12/37* (2021.01); *H04W 92/18* (2013.01)

(58) Field of Classification Search
CPC ..... H04L 63/205; H04L 63/105; H04W 12/30
See application file for complete search history.

(56) References Cited

U.S. PATENT DOCUMENTS

2005/0091355 A1* 4/2005 Keohane ............... H04W 12/08
709/224
2009/0019523 A1* 1/2009 Takahashi ............. H04L 63/105
726/3

(Continued)

FOREIGN PATENT DOCUMENTS

CN 103297961 A 9/2013
CN 104737570 A 6/2015
(Continued)

OTHER PUBLICATIONS

Molina-Masegosa, Rafael; Gozalvez, Javier; Sepulcre, Miguel; "Configuration of the C-V2X Mode 4 Sidelink PC5 Interface for Vehicular Communication," 14th International Conference on Mobile Ad-Hoc and Sensor Networks (MSN), Shenyang, China, Dec. 6-8, 2018, pp. 43-48.*

(Continued)

*Primary Examiner* — Victor Lesniewski
(74) *Attorney, Agent, or Firm* — Conley Rose, P.C.

(57) ABSTRACT

A method and an apparatus for determining a security protection mode. In the method, a terminal device may determine a security protection mode of a second communications mode based on security protection information in a first communications mode. In this way, when switching from the first communications mode to the second communications mode, the terminal device may directly use the security protection mode corresponding to the second communications mode to protect transmitted data, so as to ensure data security of the terminal device after communications mode switching is performed.

20 Claims, 8 Drawing Sheets

(51) Int. Cl.
*H04W 12/37* (2021.01)
*H04W 92/18* (2009.01)

(56) References Cited

U.S. PATENT DOCUMENTS

| | | | | |
|---|---|---|---|---|
| 2010/0235620 | A1* | 9/2010 | Nylander | H04L 65/1016 |
| | | | | 713/153 |
| 2014/0196113 | A1* | 7/2014 | Chen | H04L 63/20 |
| | | | | 726/3 |
| 2015/0281953 | A1 | 10/2015 | Liu et al. | |
| 2016/0127882 | A1* | 5/2016 | Agiwal | H04L 9/0861 |
| | | | | 713/150 |
| 2017/0195877 | A1* | 7/2017 | Lehtovirta | H04W 12/04 |
| 2018/0255562 | A1* | 9/2018 | Cho | H04W 4/42 |
| 2018/0332047 | A1* | 11/2018 | Shah | H04L 63/0464 |
| 2018/0343600 | A1 | 11/2018 | Ma et al. | |
| 2019/0090107 | A1* | 3/2019 | Kim | H04W 76/11 |
| 2019/0223008 | A1 | 7/2019 | Vanderveen et al. | |
| 2019/0313359 | A1* | 10/2019 | Lee | H04W 4/40 |
| 2019/0364424 | A1* | 11/2019 | Vanderveen | H04L 61/5053 |
| 2020/0107218 | A1 | 4/2020 | Wang et al. | |
| 2020/0221298 | A1* | 7/2020 | Pan | H04W 12/50 |
| 2020/0260283 | A1 | 8/2020 | Hu et al. | |
| 2021/0144517 | A1* | 5/2021 | Guim Bernat | H04L 47/781 |
| 2021/0258793 | A1* | 8/2021 | Rohini | H04W 76/14 |
| 2022/0132307 | A1* | 4/2022 | Perras | H04W 12/50 |
| 2022/0174481 | A1* | 6/2022 | Perras | H04W 12/03 |

FOREIGN PATENT DOCUMENTS

| | | |
|---|---|---|
| CN | 109729524 A | 5/2019 |
| CN | 109788474 A | 5/2019 |
| WO | 2014179367 A1 | 11/2014 |
| WO | 2018031344 A2 | 2/2018 |
| WO | 2018219248 A1 | 12/2018 |
| WO | 2019139689 A1 | 7/2019 |

OTHER PUBLICATIONS

Lianghai, Ji; Weinand, Andreas; Han, Bin; Schotten, Hans D.; "Multi-RATs support to improve V2X communication," IEEE Wireless Communications and Networking Conference (WCNC), Barcelona, Spain, Apr. 15-18, 2018, pp. 1-6.*

CATT ,"Uu and PC5 Availabity", 3GPP TSG-RAN2 Meeting #106 R2-1905809, Reno, USA, May 13-17, 2019, 3 Pages.

3GPP TS 23.287 V1.1.0, '3rd Generation Partnership Project;Technical Specification Group Services and System Aspects;Architecture enhancements for 5G System (5GS) to support Vehicle-to-Everything (V2X) services(Release 16); Jul. 2019, 50 pages.

LG Electronics Inc., "Protection of PC5-RRC Messages", 3GPP TSG-RAN WG2 #105bis R2-1905052, Xian, China, Apr. 8-12, 2019, 2 Pages.

3GPP TS 33.185 V15.0.0.; 3rd Generation Partnership Project; Technical Specification Group Services and System Aspects;Security aspect for LTE support of Vehicle-to-Everything (V2X) services (Release Jun. 2018, 10 pages.

Huawei et al., "Solution for bootstrapping authentication of AKMA", 3GPP TSG SA WG3 (Security) Meeting #93 S3-183420, Nov. 12-16, 2018, Spokane (USA), 4 pages.

Huawei et al., "Solution for bootstrapping authentication of AKMA", 3GPP TSG SA WG3 (Security) Meeting #93 S3-183747, Nov. 12-16, 2018, Spokane (USA), 4 pages.

3GPP TS 23.501 V16.1.0: "3rd Generation Partnership Project;Technical Specification Group Services and System Aspects;System Architecture for the 5G System;Stage 2(Release 16)", Jun. 12019, 368 pages.

3GPP TR 23.795 V16.1.0, 3rd Generation Partnership Project; Technical Specification Group Services and System Aspects; Study on application layer support for V2X services; (Release 16), Dec. 2018, 77 pages.

ETSI MCC, "Report of 3GPP TSG RAN2#105 meeting, Athens, Greece," R2-190xxxx, Feb. 25-Mar. 1, 2019 294 pages.

Huawei, et al., "New solution for UP security policy handling for PC5 and Uu interface," 3GPP TSG-SA WG3 Meeting#96-Adhoc, S3-193453, Chongqing (China), Oct. 14-18, 2019, 4 pages.

3GPP TS 33.303 V15.0.0, Jun. 2018, "3rd Generation Partnership Project; Technical Specification Group Services and System Aspects; Proximity-based Services (ProSe); Security aspects (Release 15)," 90 pages.

Qualcomm Incorporated, "Security establishment procedures for ProSe one-to-one communication," 3GPP TSG-CT WG1 Meeting #96, C1-161418, Jeju (Korea), Feb. 15-19, 2016, 37 pages.

Qualcomm Incorporated, Nokia, Enhancements to L3 Relay architecture to support REAR requirements, 3GPP TSG SA WG2 #122, S2-175290, Jun. 26-30, 2017, 17 pages.

* cited by examiner

METHOD AND APPARATUS FOR DETERMINING SECURITY PROTECTION MODE

CROSS-REFERENCE TO RELATED APPLICATIONS

This application is a continuation of International Patent Application No. PCT/CN2020/100310, filed on Jul. 5, 2020, which claims priority to Chinese Patent Application No. 201911088795.5, filed on Nov. 8, 2019, which claims priority to Chinese Patent Application No. 201910736599.8, filed on Aug. 9, 2019. All of the aforementioned patent applications are hereby incorporated by reference in their entireties.

TECHNICAL FIELD

This application relates to the field of communications technologies, and in particular, to a method and an apparatus for determining a security protection mode.

BACKGROUND

With development of communications technologies, a communications system can support communication between terminal devices in a plurality of communications modes, for example, a PC5 interface communications mode and a Uu interface communications mode.

In the PC5 interface communications mode, two terminal devices can establish a direct link through a PC5 interface for data communication.

A Uu interface is a communications interface between a terminal device and a base station. The Uu interface communications mode may specifically include two scenarios.

Scenario 1: A terminal device A and a terminal device B respectively access, through the Uu interface, a network device A and a network device B that serve the terminal device A and the terminal device B. Then, the terminal device A sends data to a core network device (for example, a user plane function (UPF) entity) through the network device A. Next, the core network device forwards the data to the terminal device B through the network device B.

Scenario 2: A terminal device A and a terminal device B respectively access, through the Uu interface, a network device A and a network device B that serve the terminal device A and the terminal device B. Then, the terminal device A forwards data to an application server in a data network (DN) through the network device A and a core network device. Next, the application server forwards the data to the terminal device B through the core network device and the network device B.

Currently, the communications system may support the terminal device in performing communications mode switching. For example, when transmitting service data in the Uu interface communications mode, the terminal device may be triggered to transmit subsequent service data in the PC5 interface communications mode. For another example, when transmitting service data in the PC5 interface communications mode, the terminal device may be triggered to transmit subsequent service data in the Uu interface communications mode.

To ensure service data security, the communications system uses a corresponding data security protection mechanism. However, different communications modes may correspond to different data security protection modes. For example, when the terminal device uses the Uu interface communications mode, the transmitted data is encrypted. When the terminal device switches to the PC5 interface communications mode, the transmitted data is not encrypted. In this case, during group communication, another terminal device that is not a receiver may intercept the data, and consequently data security of the terminal device is degraded.

Therefore, in a communications system that supports a terminal device in performing communications mode switching, how to ensure data transmission security after the terminal device performs communications mode switching is an urgent problem to be resolved by a person skilled in the art.

SUMMARY

This application provides a method and an apparatus for determining a security protection mode, in order to ensure data transmission security of a terminal device after the terminal device performs communications mode switching.

According to a first aspect, an embodiment of this application provides a method for determining a security protection mode. The method may include the following steps: A first terminal device obtains security protection information in a first communications mode, where the security protection information includes a first security protection mode and/or a first security policy, the first security protection mode corresponds to the first communications mode, and is used to protect data transmitted by the first terminal device in the first communications mode, and the first security policy is a security policy of the first terminal device in the first communications mode. Then, the first terminal device determines a second security protection mode based on the security protection information, where the second security protection mode corresponds to a second communications mode, and is used to protect data transmitted by the first terminal device in the second communications mode.

According to the method, the first terminal device may determine the security protection mode corresponding to the second communications mode based on the security protection information in the first communications mode. In this way, when switching from the first communications mode to the second communications mode, the first terminal device may directly use the security protection mode corresponding to the second communications mode to protect transmitted data, in order to ensure data security of the first terminal device after communications mode switching is performed.

In a possible design, when requesting to use the first communications mode or being to use the first communications mode, the first terminal device may obtain the security protection information in the first communications mode, and predetermine the second security protection mode based on the security protection information. In this way, when switching from the first communications mode to the second communications mode, the first terminal device may directly use the second security protection mode for protection, to avoid a delay caused by determining the second security protection mode during switching, thereby improving communication efficiency of the first terminal device.

For example, the first terminal device may obtain security protection information in a Uu interface communications mode from a network device in a protocol data unit (PDU) session establishment procedure or during registration, and determine, through the security protection information, a second security protection mode corresponding to a PC5 interface communications mode.

For example, when requesting to use a PC5 interface communications mode, the first terminal device may alternatively obtain security protection information in the PC5 interface communications mode locally or from an application server, and determine, through the security protection information, a second security protection mode corresponding to a Uu interface communications mode.

For example, when requesting to use a PC5 interface communications mode, the first terminal device may alternatively obtain first security protection information in a Uu interface communications mode from a network device and obtain second security protection information in the PC5 interface communications mode locally or from an application server, then select security protection information with a higher priority as target security protection information based on priorities of the first security protection information and the second security protection information (for example, the priority of the first security protection information is used as a first priority, or the priority of the second security protection information is used as a first priority), and next determine, based on the target security protection information, a second security protection mode corresponding to the Uu interface communications mode.

In a possible design, when determining to switch from the first communications mode to the second communications mode, the first terminal device may obtain the security protection information in the first communications mode, and predetermine the second security protection mode based on the security protection information. Optionally, the first terminal device may perform the foregoing procedure before the switching, during the switching, or after the switching. This is not limited in this application. Optionally, the first security protection mode corresponding to the first communications mode may be determined by the first terminal device using the method in the scenario 1 or in another manner. This is not limited in this application.

In a possible design, to ensure data transmission security of the first terminal device after the first terminal device performs communications mode switching, a protection level of the second security protection mode that is determined by the first terminal device is not lower than a protection level specified in the security protection information in the first communications mode.

In a possible design, when the security protection information is the first security protection mode, that the first terminal device determines a second security protection mode based on the security protection information includes the following.

The first terminal device determines that the second security protection mode is the same as the first security protection mode.

Alternatively, the first terminal device obtains a second security policy, where the second security policy is a security policy of the first terminal device in the second communications mode. The first terminal device determines the second security protection mode based on the second security policy and the first security protection mode, where a protection level of the second security protection mode is not lower than a protection level of the second security policy, and is not lower than a protection level of the first security protection mode.

In this design, it can be ensured that the protection level of the second security protection mode is not lower than the protection level of the first security protection mode. In addition, when the first terminal device can obtain the second security policy, it is further ensured that the protection level of the second security protection mode is not lower than the protection level of the second security policy.

In a possible design, that the first terminal device determines the second security protection mode based on the second security policy and the first security protection mode includes the following.

When the protection level of the first security protection mode is that security protection is required, the first terminal device determines that the protection level of the second security protection mode is that security protection is required.

Alternatively, when the protection level of the first security protection mode is that security protection is not required, and the protection level of the second security policy is that security protection is required, the first terminal device determines that the protection level of the second security protection mode is that security protection is required.

Alternatively, when the protection level of the first security protection mode is that security protection is not required, and the protection level of the second security policy is that security protection is preferred, the first terminal device determines the protection level of the second security protection mode based on a security protection capability of the first terminal device.

Alternatively, when the protection level of the first security protection mode is that security protection is not required, and the protection level of the second security policy is that security protection is not required, the first terminal device determines that the protection level of the second security protection mode is that security protection is not required.

In this design, it can be ensured that the protection level of the second security protection mode is not lower than the protection level of the second security policy and the protection level of the first security protection mode.

In a possible design, when the security protection information is the first security policy, that the first terminal device determines a second security protection mode based on the security protection information includes the following.

The first terminal device determines the second security protection mode based on the first security policy.

Alternatively, the first terminal device obtains a second security policy, where the second security policy is a security policy of the first terminal device in the second communications mode. The first terminal device determines the second security protection mode based on the second security policy and the first security policy, where a protection level of the second security protection mode is not lower than a protection level of the second security policy, and is not lower than a protection level of the first security policy.

In this design, it can be ensured that the protection level of the second security protection mode is not lower than the protection level of the first security policy. In addition, when the first terminal device can obtain the second security policy, it is further ensured that the protection level of the second security protection mode is not lower than the protection level of the second security policy.

In a possible design, that the first terminal device determines the second security protection mode based on the second security policy and the first security policy includes the following.

When the protection level of the second security policy is that security protection is required, the first terminal device determines that the protection level of the second security protection mode is that security protection is required.

Alternatively, when the protection level of the second security policy is that security protection is preferred or security protection is not required, the first terminal device determines the protection level of the second security protection mode based on the protection level of the first security policy.

In this design, it can be ensured that the protection level of the second security protection mode is not lower than the protection level of the second security policy and the protection level of the first security policy.

In a possible design, that the first terminal device determines the second security protection mode based on the first security policy includes the following.

When the protection level of the first security policy is that security protection is required, the first terminal device determines that the protection level of the second security protection mode is that security protection is required.

Alternatively, when the protection level of the first security policy is that security protection is preferred, the first terminal device determines the protection level of the second security protection mode based on a security protection capability of the first terminal device.

Alternatively, when the protection level of the first security policy is that security protection is not required, the first terminal device determines that the protection level of the second security protection mode is that security protection is not required.

In this design, it can be ensured that the protection level of the second security protection mode is not lower than the protection level of the first security policy.

In a possible design, after the first terminal device determines the second security protection mode, the first terminal device may further determine a fourth security protection mode using the following methods. The fourth security protection mode is used to protect data transmitted between the first terminal device and a second terminal device in the second communications mode. In this way, when switching to the second communications mode and transmitting data to the second terminal device, the first terminal device may directly use the fourth security protection mode to protect the data transmitted between the first terminal device and the second terminal device.

Method 1: The first terminal device sends the second security protection mode to the second terminal device, and receives the fourth security protection mode determined by the second terminal device based on the second security protection mode and a third security protection mode.

Method 2: The first terminal device receives a third security protection mode sent by the second terminal device, and determines the fourth security protection mode based on the second security protection mode and the third security protection mode.

In the foregoing methods, a protection level of the fourth security protection mode is not lower than the protection level of the second security protection mode, and is not lower than a protection level of the third security protection mode, the third security protection mode is used to protect data transmitted by the second terminal device in the second communications mode, and the fourth security protection mode is used to protect data transmitted between the first terminal device and the second terminal device in the second communications mode.

In a possible design, that the first terminal device determines the fourth security protection mode based on the second security protection mode and the third security protection mode includes the following.

When at least one of the protection level of the second security protection mode or the protection level of the third security protection mode is that security protection is required, the first terminal device determines that the protection level of the fourth security protection mode is that security protection is required.

Alternatively, when both the protection level of the second security protection mode and the protection level of the third security protection mode are that security protection is not required, the first terminal device determines that the protection level of the fourth security protection mode is that security protection is not required.

In this design, it can be ensured that the protection level of the fourth security protection mode is not lower than the protection level of the second security protection mode and the protection level of the third security protection mode.

In a possible design, when the security protection information is the first security policy, the second security protection mode is used to protect data transmitted between the first terminal device and a second terminal device in the second communications mode, and the first terminal device may negotiate with the second terminal device using the following methods, to determine the second security protection mode.

Method 1: The first terminal device sends the first security policy to the second terminal device, and receives the second security protection mode determined by the second terminal device based on the first security policy and a third security policy.

Method 2: The first terminal device receives the third security policy sent by the second terminal device, and determines the second security protection mode based on the first security policy and the third security policy.

A protection level of the second security protection mode is not lower than a protection level of the first security policy, and is not lower than a protection level of the third security policy, and the third security policy is a protection level of the second terminal device in the first communications mode.

In a possible design, that the first terminal device determines the second security protection mode based on the first security policy and the third security policy includes the following.

When at least one of the protection level of the first security policy or the protection level of the third security policy is that security protection is required, the first terminal device determines that the protection level of the second security protection mode is that security protection is required.

Alternatively, when both the protection level of the first security policy and the protection level of the third security policy are that security protection is not required, the first terminal device determines that the protection level of the second security protection mode is that security protection is not required.

Alternatively, when both the protection level of the first security policy and the protection level of the third security policy are that security protection is preferred, or when one of the protection level of the first security policy or the protection level of the third security policy is that security protection is preferred and the other is that security protection is not required, the first terminal device determines the protection level of the second security protection mode based on a security protection capability of the first terminal device.

In this design, it can be ensured that the protection level of the second security protection mode is not lower than the protection level of the first security policy and the protection level of the third security policy.

In a possible design, the first terminal device obtains the security protection information in the first communications mode when determining to switch from the first communications mode to the second communications mode.

In a possible design, when the second communications mode is a Uu interface communications mode, that the first terminal device determines a second security protection mode based on the security protection information includes the following.

The first terminal device sends the security protection information to a network device, and receives the second security protection mode from the network device, where the second security protection mode is determined by the network device based on the security protection information.

Alternatively, the first terminal device sends the security protection information to an application server and sends a request message to a network device, and the first terminal device receives the second security protection mode from the network device, where the second security protection mode is determined by the network device based on the security protection information obtained from the application server.

In this design, the first terminal device may obtain the second security protection mode from the network device.

In a possible design, when the security protection information includes the first security protection mode, the second security protection mode is the same as the first security protection mode; or a protection level of the second security protection mode is higher than a protection level of the first security protection mode; or the second security protection mode is determined by the network device based on the first security protection mode and/or a second security policy, where the second security policy is a protection level that is obtained by the network device and that is used when the first terminal device uses the second communications mode; or the second security protection mode is determined by the network device based on the first security protection mode and a third security protection mode, where the third security protection mode is determined by the network device based on the second security policy.

In this design, the network device may determine the second security protection mode using a plurality of methods.

In a possible design, when a protection level of the second security policy is that security protection is required, the protection level of the second security protection mode is that security protection is required.

Alternatively, when a protection level of the second security policy is that security protection is preferred, and the protection level of the first security protection mode is that security protection is required, the protection level of the second security protection mode is that security protection is required.

Alternatively, when a protection level of the second security policy is that security protection is preferred, and the protection level of the first security protection mode is that security protection is not required, the protection level of the second security protection mode is specified by the network device.

Alternatively, when a protection level of the second security policy is that security protection is not required, and the protection level of the first security protection mode is that security protection is required, the protection level of the second security protection mode is that security protection is required.

Alternatively, when a protection level of the second security policy is that security protection is not required, and the protection level of the first security protection mode is that security protection is not required, the protection level of the second security protection mode is that security protection is not required.

In this design, it can be ensured that the protection level of the second security protection mode is not lower than the protection level of the second security policy and the protection level of the first security protection mode.

In a possible design, when a protection level of the third security protection mode is that security protection is required, the protection level of the second security protection mode is that security protection is required.

Alternatively, when a protection level of the third security protection mode is that security protection is not required, and the protection level of the first security protection mode is that security protection is required, the protection level of the second security protection mode is that security protection is required.

Alternatively, when a protection level of the third security protection mode is that security protection is not required, and the protection level of the first security protection mode is that security protection is not required, the protection level of the second security protection mode is that security protection is not required.

In this design, it can be ensured that the protection level of the second security protection mode is not lower than the protection level of the third security protection mode and the protection level of the first security protection mode.

In a possible design, when the second communications mode is a PC5 interface communications mode, the second security protection mode is used to protect data transmitted between the first terminal device and a second terminal device in the second communications mode, and the first terminal device may negotiate with the second terminal device using the following methods, to determine the second security protection mode.

Method 1: When the security protection information includes the first security protection mode, the first terminal device sends the first security protection mode to the second terminal device, and receives the second security protection mode from the second terminal device, where the second security protection mode is determined by the second terminal device based on the first security protection mode and a third security protection mode, and a protection level of the second security protection mode is not lower than a protection level of the first security protection mode, and is not lower than a protection level of the third security protection mode.

Method 2: When the security protection information includes the first security protection mode, the first terminal device receives a third security protection mode from the second terminal device, and determines the second security protection mode based on the first security protection mode and the third security protection mode, where a protection level of the second security protection mode is not lower than a protection level of the first security protection mode, and is not lower than a protection level of the third security protection mode.

Method 3: When the security protection information includes the first security protection mode and the first security policy, the first terminal device sends the first security protection mode and the first security policy to the second terminal device, and the first terminal device receives the second security protection mode from the second terminal device, where the second security protection mode is determined by the second terminal device based on the first security protection mode, the first security policy, a third security protection mode, and a second security policy; and when the first security protection mode is the same as the third security protection mode, the second security protection mode is the same as the first security protection mode; or when the first security protection mode is different from the third security protection mode, a protection level of the second security protection mode is not lower than a protection level of the first security protection mode and a protection level of the second security protection mode, and is not lower than a protection level of the first security policy and a protection level of the second security policy.

Method 4: When the security protection information includes the first security protection mode and the first security policy, the first terminal device receives a third security protection mode and a second security policy from the second terminal device, and the first terminal device determines the second security protection mode based on the first security protection mode, the first security policy, the third security protection mode, and the second security policy, where when the first security protection mode is the same as the third security protection mode, the second security protection mode is the same as the first security protection mode; or when the first security protection mode is different from the third security protection mode, a protection level of the second security protection mode is not lower than a protection level of the first security protection mode and a protection level of the second security protection mode, and is not lower than a protection level of the first security policy and a protection level of the second security policy.

In the foregoing methods, the third security protection mode is used to protect data transmitted by the second terminal device in the first communications mode, and the second security policy is a security policy of the second terminal device in the first communications mode.

According to the foregoing methods, it can be ensured that the protection level of the second security protection mode is not lower than the protection level that is of the security protection information in the first communications mode and that is determined by the first terminal device, and is not lower than the protection level that is of the security protection information in the first communications mode and that is determined by the second terminal device.

In a possible design, that the first terminal device determines the second security protection mode based on the first security protection mode and the third security protection mode includes the following.

When the protection level of the third security protection mode is that security protection is required, and the protection level of the first security protection mode is that security protection is required, the first terminal device determines that the protection level of the second security protection mode is that security protection is required.

Alternatively, when the protection level of the third security protection mode is that security protection is required, and the protection level of the first security protection mode is that security protection is not required, the first terminal device determines the protection level of the second security protection mode through a network device.

Alternatively, when the protection level of the third security protection mode is that security protection is not required, and the protection level of the first security protection mode is that security protection is required, the first terminal device determines that the protection level of the second security protection mode is that security protection is required.

Alternatively, when the protection level of the third security protection mode is that security protection is not required, and the protection level of the first security protection mode is that security protection is not required, the first terminal device determines that the protection level of the second security protection mode is that security protection is not required.

According to the foregoing method, it can be ensured that the protection level of the second security protection mode is not lower than the protection level of the first security protection mode and the protection level of the third security protection mode.

In a possible design, that the first terminal device determines the second security protection mode based on the first security protection mode, the first security policy, the third security protection mode, and the second security policy includes the following.

When the first security protection mode is the same as the third security protection mode, the first terminal device determines that the second security protection mode is the first security protection mode.

Alternatively, when the first security protection mode is different from the third security protection mode, the first terminal device determines the second security protection mode based on the first security policy and the second security policy.

In a possible design, that the first terminal device determines the second security protection mode based on the first security protection mode, the first security policy, the third security protection mode, and the second security policy includes the following.

When the protection level of the third security protection mode is that security protection is required, and the protection level of the first security protection mode is that security protection is required, the first terminal device determines that the protection level of the second security protection mode is that security protection is required.

Alternatively, when the protection level of the third security protection mode is that security protection is required, and the protection level of the first security protection mode is that security protection is not required, the first terminal device determines the protection level of the second security protection mode through a network device.

Alternatively, when the protection level of the third security protection mode is that security protection is not required, and the protection level of the first security protection mode is that security protection is required, the first terminal device determines that the protection level of the second security protection mode is that security protection is required.

Alternatively, when the protection level of the third security protection mode is that security protection is not required, and the protection level of the first security protection mode is that security protection is not required, the first terminal device determines the second security protection mode based on the first security policy and the second security policy.

In a possible design, that the first terminal device determines the second security protection mode based on the first security policy and the second security policy includes the following.

When at least one of the protection level of the first security policy or the protection level of the second security policy is that security protection is required, the first terminal device determines that the protection level of the second security protection mode is that security protection is required.

Alternatively, when both the protection level of the first security policy and the protection level of the second security policy are that security protection is not required, the first terminal device determines that the protection level of the second security protection mode is that security protection is not required.

Alternatively, when both the protection level of the first security policy and the protection level of the second security policy are that security protection is preferred, or when one of the protection level of the first security policy or the protection level of the third security policy is that security protection is preferred and the other is that security protection is not required, the first terminal device determines the protection level of the second security protection mode based on a security protection capability of the first terminal device.

In this design, it can be ensured that the protection level of the second security protection mode is not lower than the protection level of the first security policy and the protection level of the second security policy.

In a possible design, any one of the foregoing security policies includes a confidentiality protection requirement and/or an integrity protection requirement. Correspondingly, any one of the foregoing security protection modes includes a confidentiality protection requirement and/or an integrity protection requirement.

According to a second aspect, an embodiment of this application provides an apparatus for determining a security protection method, including units configured to perform the steps in the first aspect.

According to a third aspect, an embodiment of this application provides a terminal device, including at least one processing element and at least one storage element. The at least one storage element is configured to store a program and data, and the at least one processing element is configured to perform the method provided in the first aspect of this application.

According to a fourth aspect, an embodiment of this application further provides a computer program. When the computer program is run on a computer, the computer is enabled to perform the method provided in the first aspect.

According to a fifth aspect, an embodiment of this application further provides a computer storage medium. The computer storage medium stores a computer program, and when the computer program is run on a computer, the computer is enabled to perform the method provided in the first aspect.

According to a sixth aspect, an embodiment of this application further provides a chip. The chip is configured to read a computer program stored in a memory, to perform the method provided in the first aspect.

According to a seventh aspect, an embodiment of this application further provides a chip system. The chip system includes a processor, configured to support a computer apparatus in implementing the method provided in the first aspect. In a possible design, the chip system further includes a memory, and the memory is configured to store a program and data that are necessary for the computer apparatus. The chip system may include a chip, or may include a chip and another discrete device.

DESCRIPTION OF EMBODIMENTS

Figure 1:
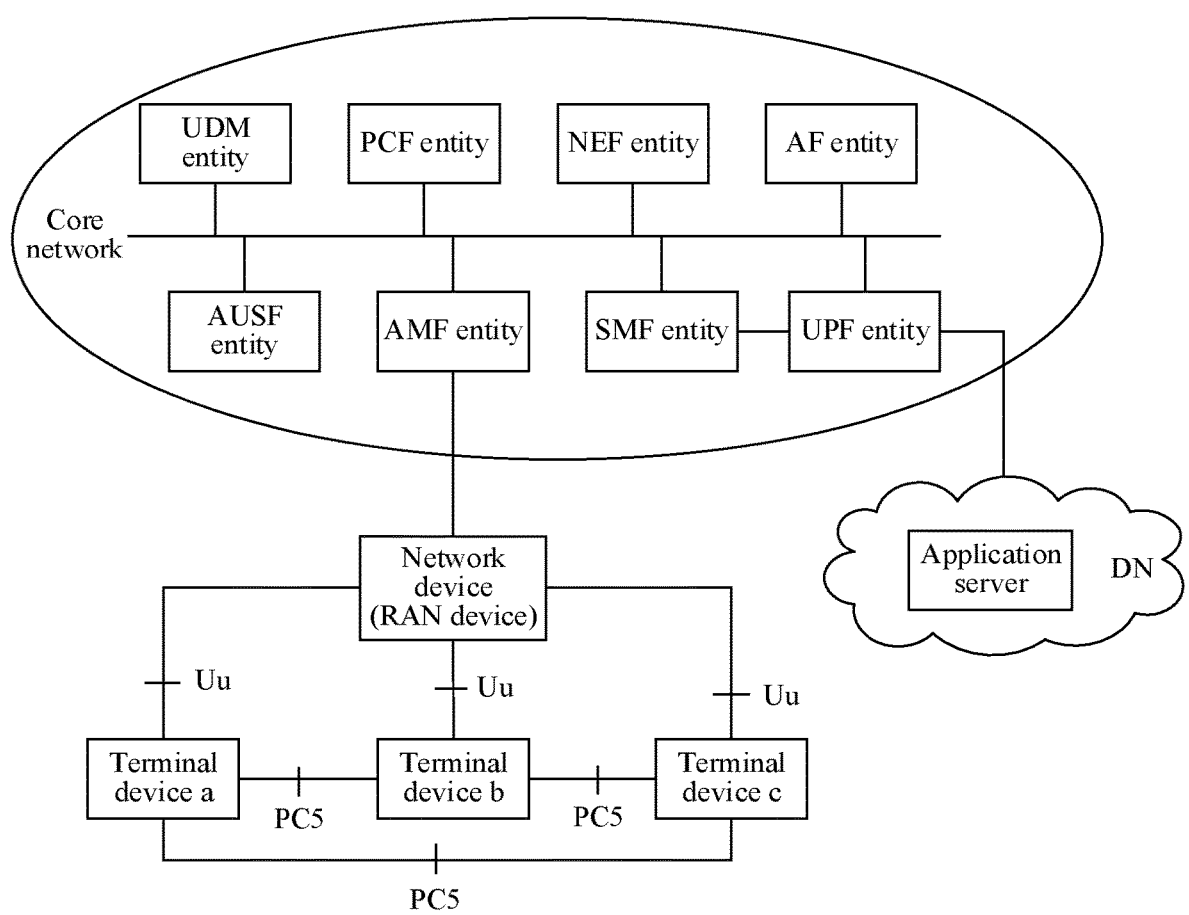
FIG. 1 is an architectural diagram of a communications system according to an embodiment of this application.

The embodiments of this application provide a method and an apparatus for determining a security protection mode, in order to ensure data transmission security of a terminal device after the terminal device performs communications mode switching. The method and the apparatus are based on a same technical concept. Because problem-resolving principles of the method and the apparatus are similar, implementations of the apparatus and the method may be mutually referenced, and repeated parts are not described.

The following describes some terms in this application, to facilitate understanding of a person skilled in the art.

(1) Network device: The network device is a device that connects a terminal to a wireless network in a communications system. The network device is a node in a radio access network, and may also be referred to as a base station or a radio access network (RAN) node (or device).

Currently, some examples of the network device are: a gNB, a transmission reception point (TRP), an evolved NodeB (eNB), a radio network controller (RNC), a NodeB (NB), an access point (AP), a base station controller (BSC), a base transceiver station (BTS), a home base station (for example, a home evolved NodeB or a home NodeB (HNB)), a baseband unit (BBU), an enterprise LTE discrete narrowband aggregation (eLTE-DSA) base station, and the like.

In addition, in a network structure, the network device may include a centralized unit (CU) node and a distributed unit (DU) node. In this structure, protocol layers of an eNB in a Long-Term Evolution (LTE) system are separated. Functions of some protocol layers are all controlled by a CU, and functions of some or all of remaining protocol layers are distributed in DUs. The DUs are all controlled by the CU. For example, a method to be performed by the network device may be performed by a CU, or certainly may be performed by a DU.

(2) Terminal device: The terminal device is a device that provides voice and/or data connectivity for a user. The terminal device may also be referred to as a user equipment (UE), a mobile station (MS), a mobile terminal (MT), or the like.

For example, the terminal device may be a handheld device or a vehicle-mounted device that has a wireless connection function. Currently, some examples of the terminal device are: a mobile phone, a tablet computer, a notebook computer, a palmtop computer, a mobile internet device (MID), a point of sale (POS), a wearable device, a virtual reality (VR) device, an augmented reality (AR) device, a wireless terminal in industrial control, a wireless terminal in self driving, a wireless terminal in remote medical surgery, a wireless terminal in smart grid, a wireless terminal in transportation safety, a wireless terminal in smart city, a wireless terminal in smart home, various smart meters (a smart water meter, a smart electricity meter, and a smart gas meter), eLTE-DSA UE, a device that has an integrated access and backhaul (IAB) capability, and the like.

(3) Uu interface: The Uu interface is an interface between a terminal device and an access network (that is, a network device) in a communications system, is also referred to as an air interface, and is mainly configured to: transmit user plane data and control plane-related signaling between the terminal device and the network device, and establish, reconfigure, and release various mobile communications radio bearer services.

(4) PC5 interface: The PC5 interface is an interface, for direct communication between terminal devices, that is introduced in the device-to-device (D2D) project of the 3rd Generation Partnership Project (3GPP) release 12 (Rel-12). Data may be transmitted between adjacent terminals through a direct link within an effective communication range of the PC5 interface, and does not need to be forwarded through a central node (for example, a base station), and information does not need to be transmitted through a conventional cellular link. Therefore, communication is performed more quickly and conveniently.

(5) Communications mode: The communications mode corresponds to a communications technology or a communications interface, for example, a Uu interface communications mode or a PC5 interface communications mode. In a communications system, a terminal device needs to use a communications mode and a corresponding communications technology to establish a communication connection to another terminal device through a corresponding communications interface, to implement service transmission.

It should be noted that the communications system may support a plurality of communications modes. To be more specific, the terminal device may perform transmission in a first communications mode, or may perform transmission in a second communications mode. In addition, in this application, the communications system may further support the terminal device in performing communications mode switching. For example, when transmitting service data in the Uu interface communications mode, the terminal device may be triggered to transmit subsequent service data in the PC5 interface communications mode. For another example, when transmitting service data in the PC5 interface communications mode, the terminal device may be triggered to transmit subsequent service data in the Uu interface communications mode.

(6) Security policy in a communications mode: The security policy in the communications mode is a protection policy that is specified on a network side and that is used when a terminal device uses the communications mode. In an example, the security policy may include a confidentiality protection requirement and/or an integrity protection requirement.

A protection level of any protection requirement in the security policy may include but is not limited to the following two classification manners.

Classification manner 1: 1. Security protection is required. 2. Security protection is not required.

Classification manner 2: 1. Security protection is required. 2. Security protection is preferred (preferred). 3. Security protection is not required (not needed).

(7) Security protection mode corresponding to a communications mode: The security protection mode corresponding to the communications mode is used to protect data transmitted when a terminal device uses the communications mode, and specifies a protection level for data. Generally, the security protection mode may be determined using a security policy.

The security protection mode may include a confidentiality protection requirement and/or an integrity protection requirement.

Generally, a protection level of the security protection mode is that security protection is required or security protection is not required.

(8) Term "and/or": The term "and/or" describes an association relationship between associated objects and represents that three relationships may exist. For example, A and/or B may represent the following three cases: Only A exists, both A and B exist, and only B exists. The character "/" generally represents an "or" relationship between the associated objects.

It should be noted that "a plurality of" in this application means two or more than two.

In addition, it should be understood that in descriptions of this application, terms such as "first" and "second" are merely used for ease of distinguishing, but should not be understood as an indication or implication of relative importance or an indication or implication of an order.

The following describes the embodiments of this application in detail with reference to the accompanying drawings.

FIG. 1 shows an architecture of a possible communications system to which a method for determining a security protection mode is applicable according to an embodiment of this application. Referring to FIG. 1, the communications system includes a terminal device, an access network (AN), a core network, and a data network (DN).

The DN may be the internet, an Internet Protocol (IP) multimedia service (IMS) network, a regional network, or the like. The DN includes an application server, and the application server provides a service for the terminal device by transmitting data to the terminal device.

The access network provides a radio access-related service for the terminal device. The radio access network includes a network device. The network device provides a specific radio access service for the terminal device, and implements functions such as a physical layer function, resource scheduling and radio resource management, quality of service (QOS) management, radio access control, and mobility management.

The core network is responsible for connecting the terminal device to different data networks based on a call request or a service request sent by the terminal device through the access network in the communications system, and is responsible for services such as charging, mobility management, and session management. In this embodiment of this application, logical functions of a core network device are classified into a control plane network element and a user plane network element.

The user plane network element may also be referred to as a user plane function (UPF) entity, is an anchor for maintaining service continuity of the terminal device, and is responsible for forwarding user plane data of the terminal device.

The control plane network element is a network element that has a control management function and that is mainly responsible for implementing session management, access and mobility management, and policy control. The control plane network element may include but is not limited to: an access and mobility management function (AMF) entity, a session management function (SMF) entity, a policy control function (PCF) entity, a unified data management (UDM) entity, a network exposure function (NEF) entity, and an authentication server function (AUSF) entity.

The following describes functions of the control plane network elements in the core network.

The AMF entity is configured to perform functions such as registration, mobility management, and tracking area update of the terminal device.

The SMF entity is configured to perform session management (including session establishment, modification, and release) of the terminal device, selection and reselection of the UPF entity, IP address assignment of the terminal device, QoS control, and the like.

The PCF entity may be configured to perform a function such as policy control decision-making.

The UDM entity may be configured to manage subscription data of the terminal device and registration information related to the terminal device.

The AUSF entity is configured to perform authentication on the terminal device during registration.

It should be further noted that the foregoing entities in the core network may be network elements that are implemented on dedicated hardware, or may be software instances that are run on dedicated hardware, or may be instances that implement a virtualization function on a proper platform. For example, the foregoing virtualization platform may be a cloud platform. In addition, the foregoing entities are classified based on functions. During actual application, based on logical functions, any functional entity may be split into a plurality of functional entities, or a plurality of functional entities are integrated into one functional entity. This is not limited in this application.

In the communications system shown in FIG. 1, the terminal device communicates with the network device through a Uu interface, as shown in the figure. When two terminal devices transmit data in a Uu interface communications mode, the following scenarios may be included.

Scenario 1: A terminal device a and a terminal device b respectively access, through the Uu interface, a network device A and a network device B that serve the terminal device a and the terminal device b. Then, the terminal device A sends data to the UPF entity in the core network through the network device A. Next, the UPF entity forwards the data to the terminal device B through the network device B.

Scenario 2: A terminal device a and a terminal device b respectively access, through the Uu interface, a network device A and a network device B that serve the terminal device a and the terminal device b. Then, the terminal device A sends data to the network device B through the network device A. Next, the network device B forwards the data to the terminal device B.

Scenario 3: A terminal device A and a terminal device B respectively access, through the Uu interface, a network device A and a network device B that serve the terminal device A and the terminal device B. Then, the terminal device A forwards data to the application server in the DN through the network device A and the UPF entity. Next, the application server forwards the data to the terminal device B through the UPF entity and the network device B.

In the foregoing scenarios, the network device A and the network device B may be the same or may be different, and a UPF communicating with the network device A and a UPF communicating with the network device B may be the same or may be different.

In addition, when the communications system further supports a sidelink communications technology, two adjacent terminal devices may establish a direct link through a PC5 interface to perform sidelink data transmission, that is, the two terminal devices transmit data in a PC5 interface communications mode. The sidelink communications technology is a near field communications technology in which terminal devices can be directly connected, and is also referred to as a proximity service (ProSe) communications technology or a D2D communications technology. In the communications system, a plurality of terminal devices that are located in relatively close geographical locations and that support sidelink communication may form one communications sub-system. In the communications sub-system, sidelink communication may be performed between terminal devices.

It should be noted that the communications system shown in FIG. 1 does not constitute a limitation on a communications system to which the embodiments of this application are applicable. The method provided in the embodiments of this application may be applicable to various communications systems that support a plurality of communications modes. The plurality of communications modes include but are not limited to the foregoing two communications modes.

In addition, it should be further noted that the communications system provided in this application may be a comprehensive communications system obtained after a mobile communications system is coupled to any other system. A type and a standard of the mobile communications system are not limited in this application. The mobile communications system may be a future communications system (for example, a sixth-generation communications system or a seventh-generation communications system), a fifth-generation (5G) communications system, an LTE communications system, or the like. The any other system may include but is not limited to a D2D system, a vehicle to everything (V2X) system, a long term evolution-vehicle (LTE-V) system, a vehicle-to-vehicle (V2V) system, an internet of vehicles system, a machine type communications (MTC) system, an internet of things (IoT) system, a long term evolution for machine-to-machine (LTE-M) system, a machine-to-machine (M2M) system, an enterprise LTE discrete narrowband aggregation (eLTE-DSA) system, or the like.

In the communications system shown in FIG. 1, to ensure service data security during service data transmission, the communications system uses a corresponding data security protection mechanism for each communications mode. For example, when the terminal device uses the Uu interface communications mode, the terminal device and the network device may protect, using a user plane security protection mechanism shown in FIG. 2, data transmitted through the Uu interface.

Figure 2:
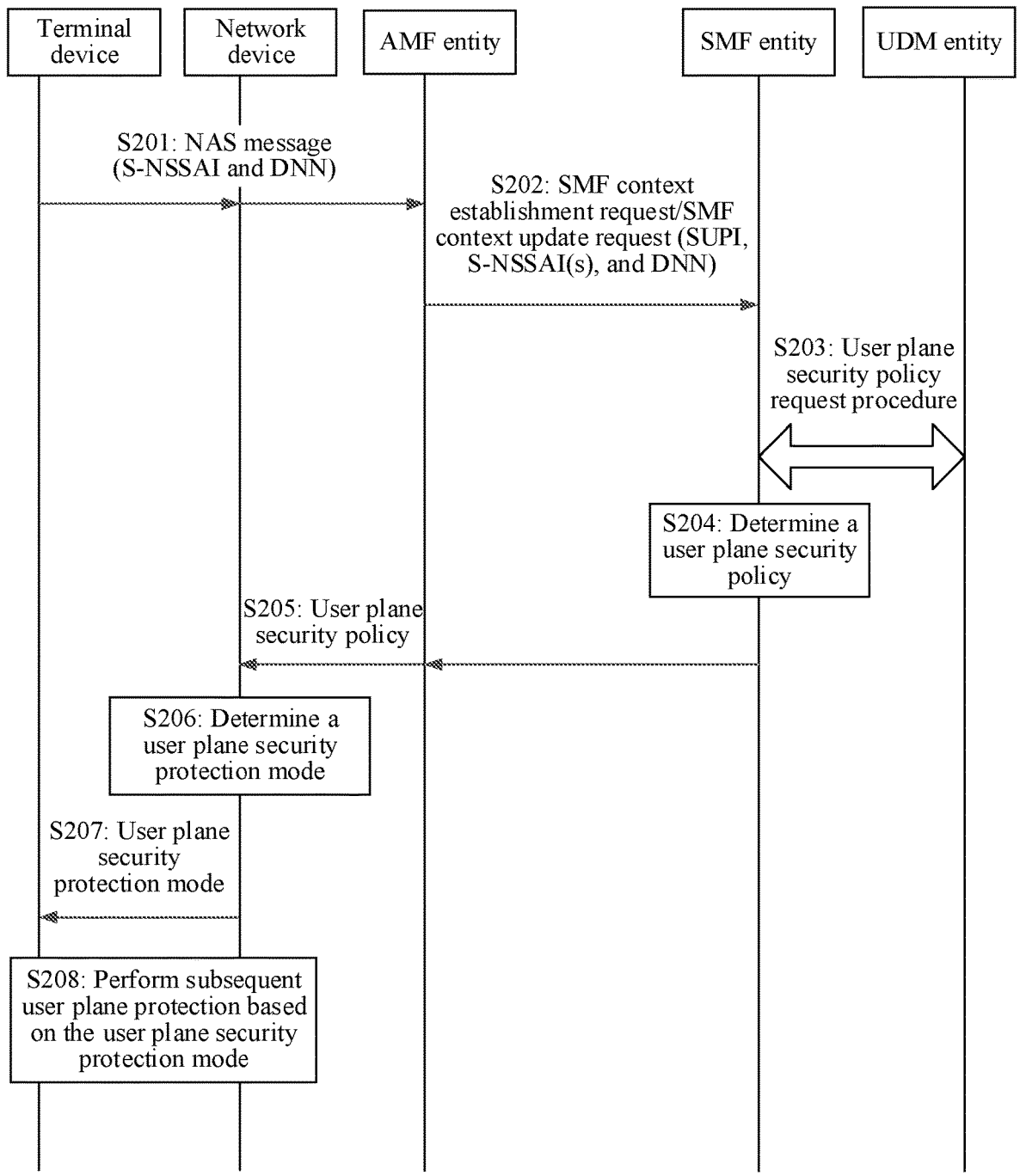
FIG. 2 is a flowchart of a user plane security protection mechanism according to an embodiment of this application.

Referring to FIG. 2, a procedure in which the communications system uses the user plane security protection mode includes the following steps.

S201: In a packet data unit (PDU) session establishment procedure, a terminal device sends a non-access stratum (NAS) message to an AMF entity through a network device, where the NAS message includes parameters such as single network slice selection assistance information (S-NSSAI) and a data network name (DNN).

Optionally, the NAS message further includes at least one or a combination of the following: a PDU session identifier (PDU Session ID) that is requested to be established, a request type, an old PDU session identifier (Old PDU Session ID), and an N1 session management (SM) container. The N1 SM container includes a PDU session establishment request (PDU session establishment request).

S202: After receiving the NAS message, the AMF entity sends an SMF context establishment request (create SMF context request) or an SMF context update request (update SMF context request) to an SMF entity, where the request carries a subscription permanent identifier (SUPI) of the terminal device, the S-NSSAI, and the DNN.

Optionally, the SMF context establishment request or the SMF context update request may further include the N1 SM container.

S203: The SMF entity requests a user plane security policy from a UDM entity. For example, the SMF entity sends a request for the user plane security policy to the UDM entity, and the request includes the SUPI, the DNN, and/or the S-NSSAI. The UDM entity may determine, based on the SUPI, the DNN, and/or the S-NSSAI, the user plane security policy that is subscribed to, and if the UDM can determine the user plane security policy, send the user plane security policy to the SMF entity.

It should be noted that, when the UDM entity stores the user plane security policy that the terminal device subscribes to, the SMF entity may obtain the user plane security policy from the UDM entity in this step. When the UDM entity does not store the user plane security policy that the terminal device subscribes to, the SMF entity cannot obtain the user plane security policy from the UDM entity in this step.

S204: The SMF entity determines a final user plane security policy. When the SMF entity may obtain the user plane security policy from the UDM entity in S203, the SMF entity determines that the obtained user plane security policy is the final user plane security policy. When the SMF entity cannot obtain the user plane security policy from the UDM entity in S203, the SMF entity may further determine the final user plane security policy from locally stored user plane security policies based on the DNN and/or the S-NSSAI.

The user plane security policy includes a confidentiality protection requirement and/or an integrity protection requirement.

S205: The SMF entity sends the determined user plane security policy to the network device through the AMF entity.

S206: The network device determines a final user plane security protection mode based on a local security protection capability (for example, whether an integrity protection rate is supported).

For example, if the user plane security policy is that security protection is required, the user plane security protection mode determined by the network device is that security protection is required, and if the network device determines that security protection cannot be locally performed, the network device sends a reject indication to the SMF entity.

For example, if the user plane security policy is that security protection is preferred, whether the user plane security protection mode determined by the network device is to perform security protection is determined by the network device based on the local security protection capability.

For another example, if the user plane security policy is that security protection is not required, the user plane security protection mode determined by the network device is that security protection is not required.

It should be noted that the security protection in the foregoing examples may be confidentiality protection or integrity protection.

S207: The network device sends the user plane security protection mode to the terminal device.

Optionally, the network device may send a security protection indication (for example, a confidentiality protection indication or an integrity protection indication) to the terminal device, where the security protection indication is used to indicate whether confidentiality protection or integrity protection is required.

Optionally, the security protection indication may further indicate a key length, a specific confidentiality protection algorithm, or a specific integrity protection algorithm.

S208: The terminal device and the network device protect subsequently transmitted user plane data based on the user plane security protection mode.

Currently, the communications system may support the terminal device in performing communications mode switching. For example, when transmitting service data in a Uu interface communications mode, the terminal device may be triggered to transmit subsequent service data in a PC5 interface communications mode. However, a data security protection mode used by the terminal device in the communications system may vary with a communications mode used by the terminal device. For example, if the user plane security protection mode used when the terminal device uses the Uu interface communications mode is that security protection is required, and the security protection mode used when the terminal device uses the PC5 interface communications mode is that security protection is not required, when the terminal device switches from the Uu interface communications mode to the PC5 interface communications mode, the terminal device cannot encrypt the data. When the terminal device performs group communication, another terminal device that is not a receiver may intercept the data transmitted by the terminal device, and consequently data security of the terminal device is degraded. In addition, if the data is initially protected, but the data is not protected after the switching, service data security is degraded.

Figure 3:
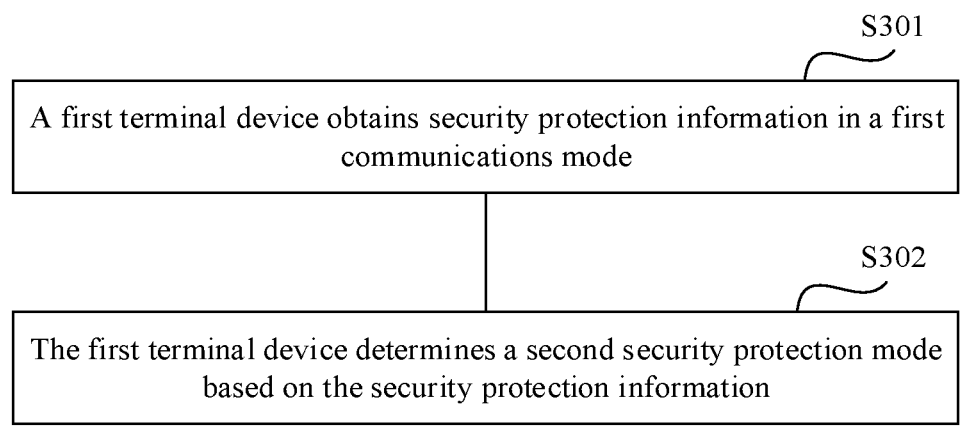
FIG. 3 is a flowchart of a method for determining a security protection mode according to an embodiment of this application.

To resolve the foregoing problem, an embodiment of this application provides a method for determining a security protection mode. The method is applicable to the communications system shown in FIG. 1 that supports a plurality of communications modes and that supports communications mode switching. A first terminal device in the method is any terminal device in the communications system. Referring to FIG. 3, the method may include the following steps.

S301: The first terminal device obtains security protection information in a first communications mode.

The security protection information includes a first security protection mode and/or a first security policy, the first security protection mode corresponds to the first communications mode, and is used to protect data transmitted by the first terminal device in the first communications mode, and the first security policy is a security policy of the first terminal device in the first communications mode.

S302: The first terminal device determines a second security protection mode based on the security protection information, where the second security protection mode corresponds a second communications mode, and is used to protect data transmitted by the first terminal device in the second communications mode.

Based on different occasions for performing the foregoing method by the first terminal device, the method is applicable to the following two scenarios.

Scenario 1: When requesting to use the first communications mode or being to use the first communications mode, the first terminal device may obtain the security protection information in the first communications mode, and predetermine the second security protection mode based on the security protection information. In this way, when switching from the first communications mode to the second communications mode, the first terminal device may directly use the second security protection mode for protection, to avoid a delay caused by determining the second security protection mode during switching, thereby improving communication efficiency of the first terminal device.

For example, the first terminal device may obtain security protection information in a Uu interface communications mode from a network device in a PDU session establishment procedure or during registration, and determine, through the security protection information, a second security protection mode corresponding to a PC5 interface communications mode.

For example, when requesting to use a PC5 interface communications mode, the first terminal device may alternatively obtain security protection information in the PC5 interface communications mode locally or from an application server, and determine, through the security protection information, a second security protection mode corresponding to a Uu interface communications mode.

Scenario 2: When determining to switch from the first communications mode to the second communications mode, the first terminal device may obtain the security protection information in the first communications mode, and predetermine the second security protection mode based on the security protection information. Optionally, the first terminal device may perform the foregoing procedure before the switching, during the switching, or after the switching. This is not limited in this application. Optionally, the first security protection mode corresponding to the first communications mode may be determined by the first terminal device using the method in the scenario 1 or in another manner. This is not limited in this application.

It should be noted that, to ensure data transmission security of the first terminal device after the first terminal device performs communications mode switching, a protection level of the second security protection mode that is determined by the first terminal device is not lower than a protection level specified in the security protection information in the first communications mode.

In an implementation of the scenario 1, when the security protection information is the first security protection mode, the first terminal device may perform S302 using the following methods.

Method 1: The first terminal device determines that the second security protection mode is the same as the first security protection mode.

Method 2: The first terminal device obtains a second security policy, where the second security policy is a security policy of the first terminal device in the second communications mode. The first terminal device determines the second security protection mode based on the second security policy and the first security protection mode, where a protection level of the second security protection mode is not lower than a protection level of the second security policy, and is not lower than a protection level of the first security protection mode.

Optionally, when the second communications mode is a PC5 communications mode, the first terminal device may obtain the second security policy locally or from an application server. When the second communications mode is a Uu communications mode, the first terminal device may obtain the second security policy from a network device.

In an example of the method 2, that the first terminal device determines the second security protection mode based on the second security policy and the first security protection mode includes the following.

When the protection level of the first security protection mode is that security protection is required, the first terminal device determines that the protection level of the second security protection mode is that security protection is required.

Alternatively, when the protection level of the first security protection mode is that security protection is not required, and the protection level of the second security policy is that security protection is required, the first terminal device determines that the protection level of the second security protection mode is that security protection is required.

Alternatively, when the protection level of the first security protection mode is that security protection is not required, and the protection level of the second security policy is that security protection is preferred, the first terminal device determines the protection level of the second security protection mode based on a security protection capability of the first terminal device.

Alternatively, when the protection level of the first security protection mode is that security protection is not required, and the protection level of the second security policy is that security protection is not required, the first terminal device determines that the protection level of the second security protection mode is that security protection is not required.

In this example, it can be ensured that the protection level of the second security protection mode that is determined by the first terminal device is not lower than the protection level of the first security protection mode and the protection level of the second security policy.

In another implementation of the scenario 1, when the security protection information is the first security policy, the first terminal device may perform S302 using the following methods.

Method 1: The first terminal device determines the second security protection mode based on the first security policy.

Method 2: The first terminal device obtains a second security policy, where the second security policy is a security policy of the first terminal device in the second communications mode. The first terminal device determines the second security protection mode based on the second security policy and the first security policy, where a protection level of the second security protection mode is not lower than a protection level of the second security policy, and is not lower than a protection level of the first security policy.

In an example of the method 2, that the first terminal device determines the second security protection mode based on the second security policy and the first security policy includes the following.

When the protection level of the second security policy is that security protection is required, the first terminal device determines that the protection level of the second security protection mode is that security protection is required.

Alternatively, when the protection level of the second security policy is that security protection is not required, the first terminal device determines the protection level of the second security protection mode based on the protection level of the first security policy.

Alternatively, when the protection level of the second security policy is that security protection is preferred, the first terminal device determines the protection level of the second security protection mode based on the protection level of the first security policy. If the first security policy is that security protection is required, the first terminal device performs protection. If the first security policy is that security protection is preferred or security protection is not required, the first terminal device determines, based on that security protection is preferred, whether to perform protection.

In an example of the method 1 and the method 2, that the first terminal device determines the second security protection mode based on the first security policy includes the following.

When the protection level of the first security policy is that security protection is required, the first terminal device determines that the protection level of the second security protection mode is that security protection is required.

Alternatively, when the protection level of the first security policy is that security protection is preferred, the first terminal device determines the protection level of the second security protection mode based on a security protection capability of the first terminal device.

Alternatively, when the protection level of the first security policy is that security protection is not required, the first terminal device determines that the protection level of the second security protection mode is that security protection is not required.

In still another implementation of the scenario 1, when the second communications mode is a PC5 interface communications mode, after the first terminal device determines the second security protection mode, the first terminal device may further negotiate with a peer device (for ease of description, which may be referred to as a second terminal device for short below) in the PC5 interface communications mode, to determine a fourth security protection mode. The fourth security protection mode is used to protect data transmitted between the first terminal device and the second terminal device in the PC5 interface communications mode.

A negotiation process may include the following methods.

Method 1: The first terminal device sends the second security protection mode to the second terminal device, and receives the fourth security protection mode determined by the second terminal device based on the second security protection mode and a third security protection mode.

Method 2: The first terminal device receives a third security protection mode sent by the second terminal device, and determines the fourth security protection mode based on the second security protection mode and the third security protection mode.

In the foregoing methods, a protection level of the fourth security protection mode is not lower than the protection level of the second security protection mode, and is not lower than a protection level of the third security protection mode, and the third security protection mode is used to protect data transmitted by the second terminal device in the second communications mode. Optionally, the third security protection mode may be determined by the second terminal device in S301 and S302. This is not limited in this application.

In an example of the foregoing two methods, the first terminal device and the second terminal device may determine the fourth security protection mode based on the second security protection mode and the third security protection mode using a same method. The following provides a description using the first terminal device as an example.

When at least one of the protection level of the second security protection mode or the protection level of the third security protection mode is that security protection is required, the first terminal device determines that the protection level of the fourth security protection mode is that security protection is required.

Alternatively, when both the protection level of the second security protection mode and the protection level of the third security protection mode are that security protection is not required, the first terminal device determines that the protection level of the fourth security protection mode is that security protection is not required.

In this example, it can be ensured that the protection level of the fourth security protection mode that is determined by the first terminal device is not lower than the protection level of the second security protection mode and the protection level of the third security protection mode.

In still another implementation of the scenario 1, when the second communications mode is a PC5 interface communications mode, the second security protection mode is used to protect data transmitted between the first terminal device and a second terminal device in the second communications mode. To be more specific, the first terminal device may directly determine, based on the security protection information in the first communications mode (security protection information of the first terminal device in the first communications mode, which is referred to as security protection information 1 for short below), a security protection mode used when the first terminal device communicates with the second terminal device in the PC5 interface communications mode.

Optionally, when performing S302, the first terminal device may determine the second security protection mode using a method obtained through negotiation with the second terminal device.

A negotiation process may include the following methods.

Method 1: The first terminal device sends the security protection information 1 to the second terminal device, and receives the second security protection mode determined by the second terminal device based on the security protection information 1 and security protection information of the second terminal device in the first communications mode (referred to as security protection information 2 for short below).

Method 2: The first terminal device receives the security protection information 2 sent by the second terminal device, and determines the second security protection mode based on the security protection information 1 and the security protection information 2.

A protection level of the second security protection mode is not lower than a protection level of the security protection information 1, and is not lower than a protection level of the security protection information 2, and the security protection information 2 includes a third security protection mode and/or a third security policy.

In an implementation of the foregoing two methods, the security protection information includes a security protection mode, and the first terminal device and the second terminal device may determine the second security protection mode based on the first security protection mode and the third security protection mode in the security protection information 2 using a same method.

The third security protection mode is a security protection mode of the second terminal device in the first communications mode. The following provides a description using the first terminal device as an example.

When at least one of a protection level of the first security protection mode or a protection level of the third security protection mode is that security protection is required, the first terminal device determines that the protection level of the third security protection mode is that security protection is required.

Alternatively, when both a protection level of the first security protection mode and a protection level of the third security protection mode are that security protection is not required, the first terminal device determines that the protection level of the third security protection mode is that security protection is not required.

In another implementation of the foregoing two methods, the security protection information includes a security policy, and the first terminal device and the second terminal device may determine the second security protection mode based on the first security policy and the third security policy in the security protection information 2 using a same method. The third security policy is a security protection mode of the second terminal device in the first communications mode. The following provides a description using the first terminal device as an example.

When at least one of a protection level of the first security policy or a protection level of the third security policy is that security protection is required, the first terminal device determines that the protection level of the second security protection mode is that security protection is required.

Alternatively, when both a protection level of the first security policy and a protection level of the third security policy are that security protection is not required, the first terminal device determines that the protection level of the second security protection mode is that security protection is not required.

Alternatively, when both a protection level of the first security policy and a protection level of the third security policy are that security protection is preferred, or when one of a protection level of the first security policy or a protection level of the third security policy is that security protection is preferred and the other is that security protection is not required, the first terminal device determines the protection level of the second security protection mode based on a security protection capability of the first terminal device.

In this example, it can be ensured that the protection level of the second security protection mode that is determined by the first terminal device is not lower than the protection level of the first security policy and the protection level of the third security policy.

In still another implementation of the foregoing two methods, the security protection information includes a security protection mode and a security policy, and the first terminal device and the second terminal device may determine the second security protection mode based on the first security protection mode and the first security policy in the security protection information 1, the third security protection mode in the security protection information 2, and a second security policy using a same method. The following provides a description using the first terminal device as an example.

An example is as follows.

When the first security protection mode is the same as the third security protection mode, the first terminal device determines that the second security protection mode is the first security protection mode.

Alternatively, when the first security protection mode is different from the third security protection mode, the first terminal device determines the second security protection mode based on the first security policy and the second security policy.

Another example is as follows.

When a protection level of the third security protection mode is that security protection is required, and a protection level of the first security protection mode is that security protection is required, the first terminal device determines that the protection level of the second security protection mode is that security protection is required.

Alternatively, when a protection level of the third security protection mode is that security protection is required, and a protection level of the first security protection mode is that security protection is not required, the first terminal device determines the protection level of the second security protection mode through a network device.

Alternatively, when a protection level of the third security protection mode is that security protection is not required, and a protection level of the first security protection mode is that security protection is required, the first terminal device determines that the protection level of the second security protection mode is that security protection is required.

Alternatively, when a protection level of the third security protection mode is that security protection is not required, and a protection level of the first security protection mode is that security protection is not required, the first terminal device determines the second security protection mode based on the first security policy and the second security policy.

In the foregoing two examples, that the first terminal device determines the second security protection mode based on the first security policy and the second security policy includes the following.

When at least one of the protection level of the first security policy or the protection level of the second security policy is that security protection is required, the first terminal device determines that the protection level of the second security protection mode is that security protection is required.

Alternatively, when both the protection level of the first security policy and the protection level of the second security policy are that security protection is not required, the first terminal device determines that the protection level of the second security protection mode is that security protection is not required.

Alternatively, when both the protection level of the first security policy and the protection level of the second security policy are that security protection is preferred, or when one of the protection level of the first security policy or the protection level of the third security policy is that security protection is preferred and the other is that security protection is not required, the first terminal device determines the protection level of the second security protection mode based on a security protection capability of the first terminal device.

In an implementation of the scenario 2, when the second communications mode is a Uu interface communications mode, the first terminal device may perform S302 using the following methods.

Method 1: The first terminal device sends the security protection information to a network device, and receives the second security protection mode from the network device, where the second security protection mode is determined by the network device based on the security protection information.

Method 2: The first terminal device sends the security protection information to an application server and sends a request message to a network device, and the first terminal device receives the second security protection mode from the network device, where the second security protection mode is determined by the network device based on the security protection information obtained from the application server.

In the method 2, after the first terminal device sends the security protection information to the application server, an SMF entity in a core network obtains the security protection information from the application server, and sends the security protection information to the network device. For example, after receiving the request message, the network device sends a PDU session establishment request to the SMF entity, to request the security protection information. In another example, the first terminal device may send both the security protection information and identification information of the security protection information to the application server. In this way, the first terminal device may send a request message including the identification information to the network device, and the network device sends the identification information to the SMF entity through a PDU session establishment request. In this way, the SMF entity can accurately obtain the security protection information from the application server based on the identification information. Alternatively, when the application server sends both the security protection information and the identification information to the SMF entity for storage, the SMF entity can accurately determine, from a plurality of pieces of locally stored security protection information based on the identification information, the security protection information corresponding to the identification information sent by the first terminal device.

Optionally, the identification information of the security protection information may be but is not limited to at least one of a carrier network identifier of a UE, a generic public subscription identifier (GPSI), an application ID, an application ID of the first terminal device, a carrier network ID of the first terminal device, or a PC5 link identifier.

In an example of the foregoing two methods, the security protection information includes the first security protection mode, and the network device may determine the second security protection mode in the following manners.

Manner 1: The second security protection mode is the same as the first security protection mode.

Manner 2: A protection level of the second security protection mode is higher than a protection level of the first security protection mode.

Manner 3: The second security protection mode is determined by the network device based on the first security protection mode and/or a second security policy, where the second security policy is a protection level that is obtained by the network device and that is used when the first terminal device uses the second communications mode.

An example of the manner 3 is as follows.

When a protection level of the second security policy is that security protection is required, the protection level of the second security protection mode is that security protection is required.

Alternatively, when a protection level of the second security policy is that security protection is preferred, and the protection level of the first security protection mode is that security protection is required, the protection level of the second security protection mode is that security protection is required.

Alternatively, when a protection level of the second security policy is that security protection is preferred, and the protection level of the first security protection mode is that security protection is not required, the protection level of the second security protection mode is specified by the network device.

Alternatively, when a protection level of the second security policy is that security protection is not required, and the protection level of the first security protection mode is that security protection is required, the protection level of the second security protection mode is that security protection is required.

Alternatively, when a protection level of the second security policy is that security protection is not required, and the protection level of the first security protection mode is that security protection is not required, the protection level of the second security protection mode is that security protection is not required.

In this example, it can be ensured that the protection level of the second security protection mode is not lower than the protection level of the second security policy and the protection level of the first security protection mode.

Manner 4: The second security protection mode is determined by the network device based on the first security protection mode and a third security protection mode, where the third security protection mode is determined by the network device based on the second security policy. An example of the manner 4 is as follows.

When a protection level of the third security protection mode is that security protection is required, the protection level of the second security protection mode is that security protection is required.

Alternatively, when a protection level of the third security protection mode is that security protection is not required, and the protection level of the first security protection mode is that security protection is required, the protection level of the second security protection mode is that security protection is required.

Alternatively, when a protection level of the third security protection mode is that security protection is not required, and the protection level of the first security protection mode is that security protection is not required, the protection level of the second security protection mode is that security protection is not required.

In this example, it can be ensured that the protection level of the second security protection mode is not lower than the protection level of the first security protection mode and the protection level of the third security protection mode.

In another implementation of the scenario 2, when the second communications mode is a PC5 interface communications mode, the second security protection mode is used to protect data transmitted between the first terminal device and a second terminal device in the second communications mode, and the first terminal device may negotiate with the second terminal device, to determine the second security protection mode. In the following negotiation methods, the third security protection mode is used to protect data transmitted by the second terminal device in the first communications mode, and the second security policy is a security policy of the second terminal device in the first communications mode.

A negotiation method may include but is not limited to the following.

Method 1: When the security protection information includes the first security protection mode, the first terminal device sends the first security protection mode to the second terminal device, and receives the second security protection mode from the second terminal device, where the second security protection mode is determined by the second terminal device based on the first security protection mode and a third security protection mode, and a protection level of the second security protection mode is not lower than a protection level of the first security protection mode, and is not lower than a protection level of the third security protection mode.

Method 2: When the security protection information includes the first security protection mode, the first terminal device receives a third security protection mode from the second terminal device, and determines the second security protection mode based on the first security protection mode and the third security protection mode, where a protection level of the second security protection mode is not lower than a protection level of the first security protection mode, and is not lower than a protection level of the third security protection mode.

In an example of the method 2, that the first terminal device determines the second security protection mode based on the first security protection mode and the third security protection mode includes the following.

When the protection level of the third security protection mode is that security protection is required, and the protection level of the first security protection mode is that security protection is required, the first terminal device determines that the protection level of the second security protection mode is that security protection is required.

Alternatively, when the protection level of the third security protection mode is that security protection is required, and the protection level of the first security protection mode is that security protection is not required, the first terminal device determines the protection level of the second security protection mode through a network device.

Alternatively, when the protection level of the third security protection mode is that security protection is not required, and the protection level of the first security protection mode is that security protection is required, the first terminal device determines that the protection level of the second security protection mode is that security protection is required.

Alternatively, when the protection level of the third security protection mode is that security protection is not required, and the protection level of the first security protection mode is that security protection is not required, the first terminal device determines that the protection level of the second security protection mode is that security protection is not required.

In this example, it can be ensured that the protection level of the second security protection mode is not lower than the protection level of the third security protection mode and the protection level of the first security protection mode.

Method 3: When the security protection information includes the first security protection mode and the first security policy, the first terminal device sends the first security protection mode and the first security policy to the second terminal device, and the first terminal device receives the second security protection mode from the second terminal device, where the second security protection mode is determined by the second terminal device based on the first security protection mode, the first security policy, a third security protection mode, and a second security policy; and when the first security protection mode is the same as the third security protection mode, the second security protection mode is the same as the first security protection mode; or when the first security protection mode is different from the third security protection mode, a protection level of the second security protection mode is not lower than a protection level of the first security protection mode and a protection level of the second security protection mode, and is not lower than a protection level of the first security policy and a protection level of the second security policy.

Method 4: When the security protection information includes the first security protection mode and the first security policy, the first terminal device receives a third security protection mode and a second security policy from the second terminal device, and the first terminal device determines the second security protection mode based on the first security protection mode, the first security policy, the third security protection mode, and the second security policy, where when the first security protection mode is the same as the third security protection mode, the second security protection mode is the same as the first security protection mode; or when the first security protection mode is different from the third security protection mode, a protection level of the second security protection mode is not lower than a protection level of the first security protection mode and a protection level of the second security protection mode, and is not lower than a protection level of the first security policy and a protection level of the second security policy.

In an example of the method 4, that the first terminal device determines the second security protection mode based on the first security protection mode, the first security policy, the third security protection mode, and the second security policy includes the following.

When the first security protection mode is the same as the third security protection mode, the first terminal device determines that the second security protection mode is the first security protection mode.

Alternatively, when the first security protection mode is different from the third security protection mode, the first terminal device determines the second security protection mode based on the first security policy and the second security policy.

In another example of the method 4, that the first terminal device determines the second security protection mode based on the first security protection mode, the first security policy, the third security protection mode, and the second security policy includes the following.

When the protection level of the third security protection mode is that security protection is required, and the protection level of the first security protection mode is that security protection is required, the first terminal device determines that the protection level of the second security protection mode is that security protection is required.

Alternatively, when the protection level of the third security protection mode is that security protection is required, and the protection level of the first security protection mode is that security protection is not required, the first terminal device determines the protection level of the second security protection mode through a network device.

Alternatively, when the protection level of the third security protection mode is that security protection is not required, and the protection level of the first security protection mode is that security protection is required, the first terminal device determines that the protection level of the second security protection mode is that security protection is required.

Alternatively, when the protection level of the third security protection mode is that security protection is not required, and the protection level of the first security protection mode is that security protection is not required, the first terminal device determines the second security protection mode based on the first security policy and the second security policy.

In the foregoing two examples, that the first terminal device determines the second security protection mode based on the first security policy and the second security policy includes the following.

When at least one of the protection level of the first security policy or the protection level of the second security policy is that security protection is required, the first terminal device determines that the protection level of the second security protection mode is that security protection is required.

Alternatively, when both the protection level of the first security policy and the protection level of the second security policy are that security protection is not required, the first terminal device determines that the protection level of the second security protection mode is that security protection is not required.

Alternatively, when both the protection level of the first security policy and the protection level of the second security policy are that security protection is preferred, or when one of the protection level of the first security policy or the protection level of the third security policy is that security protection is preferred and the other is that security protection is not required, the first terminal device determines the protection level of the second security protection mode based on a security protection capability of the first terminal device.

It should be further noted that any one of the foregoing security policies may include a confidentiality protection requirement and/or an integrity protection requirement. Correspondingly, any one of the foregoing security protection modes may include a confidentiality protection requirement and/or an integrity protection requirement. In addition, when any one of the foregoing security policies and any one of the foregoing security protection modes each include a confidentiality protection requirement and an integrity protection requirement, a confidentiality protection requirement in the second security protection mode may be determined with reference to the manners in the foregoing examples, and an integrity protection requirement in the second security protection mode may also be determined with reference to the manners in the foregoing examples.

Optionally, the security policy in this application may further include a supported key length such as 256 bits (for example, 256 bits or 192 bits). Optionally, the security policy may further include a supported integrity protection rate (for example, 64 kilobits per second (kbps) or 2 megabits per second (Mbps)). Optionally, the security policy may further include a key life cycle (for example, one day or one hour).

According to the method for determining a security protection mode provided in this embodiment of this application, the terminal device may determine the security protection mode corresponding to the second communications mode based on the security protection information in the first communications mode. In this way, when switching from the first communications mode to the second communications mode, the terminal device may directly use the security protection mode corresponding to the second communications mode to protect transmitted data, in order to ensure data security of the terminal device after communications mode switching is performed. Further, the protection level that is of the security protection mode corresponding to the second communications mode and that is determined by the terminal device is not lower than the protection level of the security protection information in the first communications mode. In this way, data security of the terminal device after communications mode switching is performed can be further ensured.

Based on the foregoing embodiment, this application further provides a plurality of instances for determining a security protection mode. The following instances are all applicable to the communications system shown in FIG. 1.

Instance 1

Figure 4:
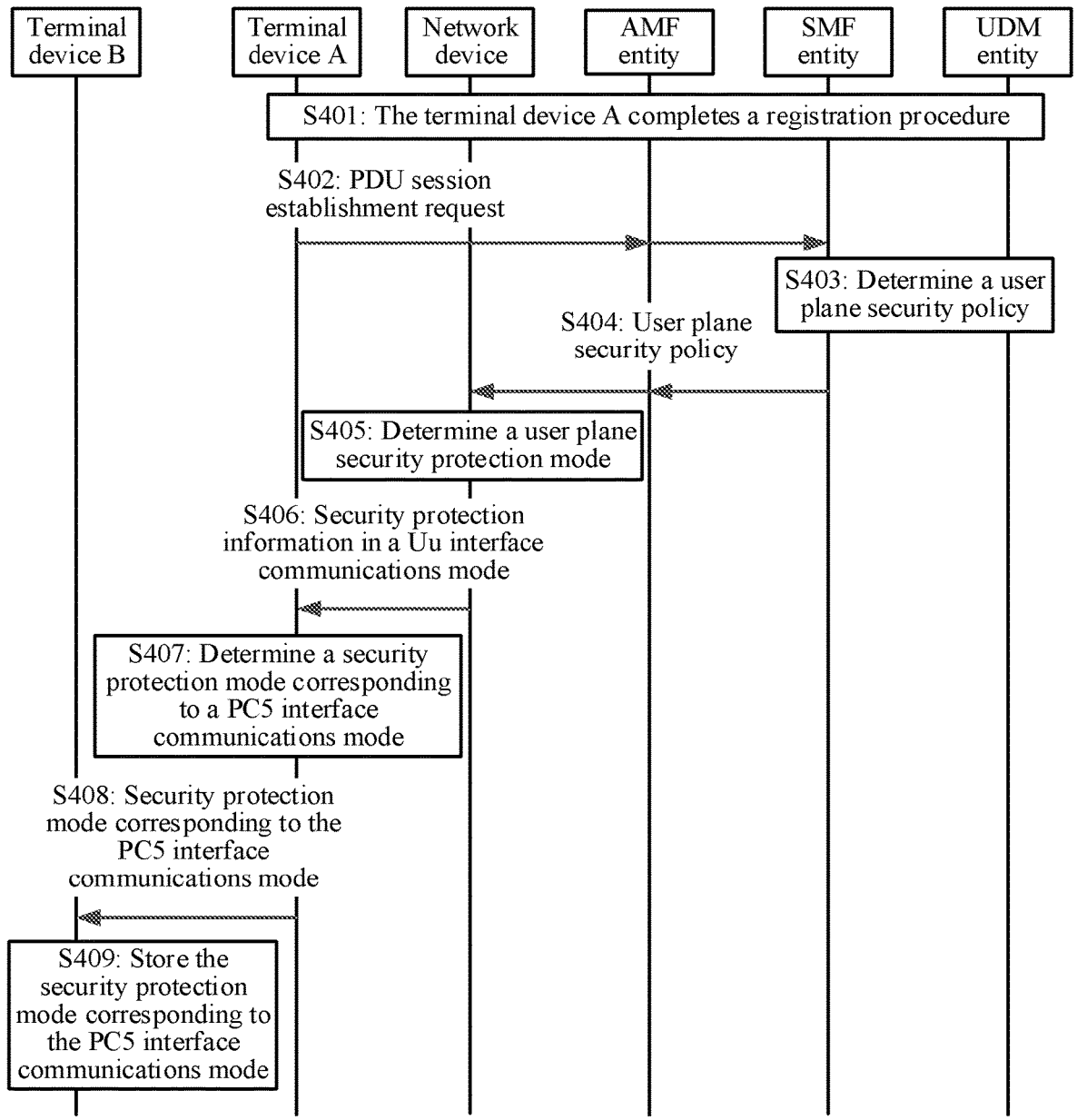
FIG. 4 is a flowchart of an instance for determining a security protection mode according to an embodiment of this application.

Referring to FIG. 4, the instance may include the following steps.

S401: A terminal device A completes a registration procedure and registers with a carrier network.

S402 to S405 are a procedure in which a network device requests a user plane security policy from an SMF entity and determines security protection information in a Uu interface communications mode through a PDU session establishment procedure. For details, refer to S201 to S306 in the user plane security protection mechanism shown in FIG. 2. Details are not described herein again.

In an example, the SMF entity may determine the user plane security policy locally or from a UDM entity according to a conventional method in S403.

In an example, in S403, the SMF entity may alternatively send a request to an application server, obtain an application security policy in a PC5 interface communications mode from the application server side, and determine the user plane security policy based on the application security policy. For example, the SMF entity determines that the application security policy is the same as the user plane security policy, or the SMF entity determines a final user plane security policy based on the application security policy and the user plane security policy previously determined by the SMF entity. In this example, in a process in which the SMF entity requests the application security policy from the application server, the SMF entity may directly perform communicative interaction with the application server, or the SMF entity performs communicative interaction with the application server across another network element. This is not limited in this application.

Optionally, a classification manner of a level of the application security policy may be as follows. Classification manner 1: Security protection is required, and security protection is not required. Classification manner 2: Security protection is required, security protection is preferred, and security protection is not required.

In an example, that the SMF entity determines that the application security policy is the same as the user plane security policy includes the following.

When the classification manner of the level of the application security policy is the classification manner 1, if the protection level of the application security policy is that security protection is required, the SMF entity determines that the user plane security policy is that security protection is required; or if the application security policy is that security protection is not required, the SMF entity determines that the user plane security policy is that security protection is not required.

Alternatively, when the classification manner of the level of the application security policy is the classification manner 2, the SMF entity determines that the application security policy may be the same as the user plane security policy.

In an example, that the SMF entity determines a final user plane security policy based on the application security policy and the user plane security policy previously determined by the SMF entity includes the following.

When the classification manner of the level of the application security policy is the classification manner 1, if the application security policy is that security protection is required, the SMF entity determines that the user plane security policy is that security protection is required; or if the application security policy is that security protection is not required, the SMF entity determines that the final user plane security policy may be the same as the previously determined user plane security policy.

Alternatively, when the classification manner of the level of the application security policy is the classification manner 2, if at least one of the application security policy or the user plane security policy previously determined by the SMF is that security protection is required, the SMF entity determines that the final user plane security policy is that security protection is required; or if both the application security policy and the user plane security policy previously determined by the SMF are that protection is not required, the SMF entity determines that the final user plane security policy is that protection is not required; or in another case, the SMF entity determines that the final user plane security policy is that protection is preferred.

S406: The network device sends the security protection information in the Uu interface communications mode to the terminal device A, where the security protection information includes the user plane security protection mode and/or the user plane security policy.

S407: The terminal device A determines a security protection mode corresponding to the PC5 interface communications mode based on the security protection information in the Uu interface communications mode, where a protection level of the security protection mode corresponding to the PC5 interface communications mode is not lower than a protection level of the security protection information in the Uu interface communications mode.

For a process in which the terminal device A determines the security protection mode corresponding to the PC5 interface communications mode, refer to corresponding descriptions in the embodiment shown in FIG. 3. The protection level of the security protection mode corresponding to the PC5 interface communications mode is not lower than the protection level of the security protection information.

In an implementation, when the security protection information is the user plane security protection mode, the terminal device A determines the security protection mode corresponding to the PC5 interface communications mode using the following methods.

Method 1: The terminal device A determines that the security protection mode corresponding to the PC5 interface communications mode is the same as the user plane security protection mode.

Method 2: The terminal device A obtains the application security policy, and determines the security protection mode corresponding to the PC5 interface communications mode based on the application security policy and the user plane security protection mode, where the protection level of the security protection mode corresponding to the PC5 interface communications mode is not lower than a protection level of the application security policy, and is not lower than a protection level of the user plane security protection mode.

An example of the method 2 is as follows.

When the protection level of the user plane security protection mode is that security protection is required, the terminal device A determines that the protection level of the security protection mode corresponding to the PC5 interface communications mode is that security protection is required.

Alternatively, when the protection level of the user plane security protection mode is that security protection is not required, and the protection level of the application security policy is that security protection is required, the terminal device A determines that the protection level of the security protection mode corresponding to the PC5 interface communications mode is that security protection is required.

Alternatively, when the protection level of the user plane security protection mode is that security protection is not required, and the protection level of the application security policy is that security protection is preferred, the terminal device A determines the protection level of the security protection mode corresponding to the PC5 interface communications mode based on a security protection capability of the terminal device A.

Alternatively, when the protection level of the user plane security protection mode is that security protection is not required, and the protection level of the application security policy is that security protection is not required, the terminal device A determines that the protection level of the security protection mode corresponding to the PC5 interface communications mode is that security protection is not required.

In another implementation, when the security protection information is the user plane security policy, the terminal device A determines the security protection mode corresponding to the PC5 interface communications mode using the following methods.

Method 1: The terminal device A determines the security protection mode corresponding to the PC5 interface communications mode based on the user plane security policy, where the protection level of the security protection mode corresponding to the PC5 interface communications mode is not lower than a protection level of the user plane security policy.

Method 2: The terminal device A obtains an application security policy, and determines the security protection mode corresponding to the PC5 interface communications mode based on the application security policy and the user plane security policy, where the protection level of the security protection mode corresponding to the PC5 interface communications mode is not lower than a protection level of the application security policy, and is not lower than a protection level of the user plane security policy.

An example of the method 1 is as follows.

When the protection level of the user plane security policy is that security protection is required, the terminal device A determines that the protection level of the security protection mode corresponding to the PC5 interface communications mode is that security protection is required.

Alternatively, when the protection level of the user plane security policy is that security protection is preferred, the terminal device A determines the protection level of the security protection mode corresponding to the PC5 interface communications mode based on a security protection capability of the terminal device A.

Alternatively, when the protection level of the user plane security policy is that security protection is not required, the terminal device A determines that the protection level of the security protection mode corresponding to the PC5 interface communications mode is that security protection is not required.

An example of the method 2 is as follows.

When the protection level of the application security policy (or the user plane security policy) is that security protection is required, the terminal device A determines that the protection level of the security protection mode corresponding to the PC5 interface communications mode is that security protection is required.

Alternatively, when the protection level of the application security policy (or the user plane security policy) is that security protection is preferred or security protection is not required, the terminal device A determines the protection level of the security protection mode corresponding to the PC5 interface communications mode based on the protection level of the user plane security policy (or the application security policy), as described in the foregoing example.

S408: The terminal device A determines that a peer device using the PC5 interface communications mode is the terminal device B, and the terminal device A sends the security protection mode corresponding to the PC5 interface communications mode to the terminal device B, or the terminal device A broadcasts the determined security protection mode corresponding to the PC5 interface communications mode.

S409: After receiving the security protection mode corresponding to the PC5 interface communications mode, the terminal device B stores the security protection mode corresponding to the PC5 interface communications mode.

In this way, when the terminal device A switches from the Uu interface communications mode to the PC5 interface communications mode, the terminal device A may directly use the security protection mode corresponding to the PC5 interface communications mode to protect transmitted data.

Instance 2

In this instance, a terminal device A may determine a security protection mode 1 corresponding to a PC5 interface communications mode using the procedure of S401 to S407 shown in FIG. 4, or a terminal device B may determine a security protection mode 2 corresponding to the PC5 interface communications mode using the procedure of S401 to S407 shown in FIG. 4. Then, the terminal device A and the terminal device B may determine, through negotiation using the security protection mode 1 corresponding to the PC5 interface communications mode and the security protection mode 2 corresponding to the PC5 interface communications mode, a security protection mode 3 that corresponds to the PC5 interface communications mode and that is used when the terminal device A and the terminal device B use the PC5 interface communications mode.

Optionally, either of the terminal device A or the terminal device B may send the locally determined security protection mode corresponding to the PC5 interface communications mode to the other terminal device, and the other terminal device determines the final security protection mode 3 corresponding to the PC5 interface communications mode based on the two security protection modes corresponding to the PC5 interface communications mode.

For example, the terminal device A may send the determined security protection mode 1 corresponding to the PC5 interface communications mode to the terminal device B. Then, the terminal device B determines the security protection mode 3 corresponding to the PC5 interface communications mode based on the security protection mode 1 corresponding to the PC5 interface communications mode and the security protection mode 2 corresponding to the PC5 interface communications mode, and then sends the security protection mode 3 corresponding to the PC5 interface communications mode to the terminal device A.

It should be noted that a protection level of the security protection mode 3 corresponding to the PC5 interface communications mode is not lower than a protection level of the security protection mode 1 corresponding to the PC5 interface communications mode and a protection level of the security protection mode 2 corresponding to the PC5 interface communications mode.

In an example, the terminal device B may determine the security protection mode 3 corresponding to the PC5 interface communications mode using the following methods.

When at least one of the protection level of the security protection mode 1 corresponding to the PC5 interface communications mode or the protection level of the security protection mode 2 corresponding to the PC5 interface communications mode is that security protection is required, the terminal device B determines that the protection level of the security protection mode 3 corresponding to the PC5 interface communications mode is that security protection is required.

Alternatively, when both the protection level of the security protection mode 1 corresponding to the PC5 interface communications mode and the protection level of the security protection mode 2 corresponding to the PC5 interface communications mode are that security protection is not required, the terminal device B determines that the protection level of the security protection mode 3 corresponding to the PC5 interface communications mode is that security protection is not required.

Instance 3

In this instance, a terminal device A may obtain security protection information 1 (including a user plane security policy 1 and/or a user plane security protection mode 1) in a Uu interface communications mode using the procedure of S401 to S406 shown in FIG. 4, or a terminal device B may obtain security protection information 2 (including a user plane security policy 2 and/or a user plane security protection mode 2) in the Uu interface communications mode using the procedure of S401 to S406 shown in FIG. 4. Then, the terminal device A and the terminal device B may determine, through negotiation using the security protection information 1 in the Uu interface communications mode and the security protection information 2 in the Uu interface communications mode, a security protection mode (referred to as a security protection mode corresponding to a PC5 interface communications mode for short below) used when the terminal device A and the terminal device B use the PC5 interface communications mode.

Optionally, either of the terminal device A and the terminal device B may send the obtained security protection information in the Uu interface communications mode to the other terminal device, and the other terminal device determines the final security protection mode corresponding to the PC5 interface communications mode based on the two pieces of security protection information in the Uu interface communications mode.

It should be noted that a protection level of the security protection mode 3 is not lower than a protection level of the security protection information 1 in the Uu interface communications mode and a protection level of the security protection information 2 in the Uu interface communications mode.

In an implementation, either of the two pieces of security protection information in the Uu interface communications mode includes a user plane security policy, and that either of the terminal devices (the terminal device A is used as an example) determines the security protection mode corresponding to the PC5 interface communications mode based on the user plane security policy 1 and the user plane security policy 2 includes the following.

When at least one of the protection level of the user plane security policy 1 or the protection level of the user plane security policy 2 is that security protection is required, the terminal device A determines that the protection level of the security protection mode corresponding to the PC5 interface communications mode is that security protection is required.

Alternatively, when both the protection level of the user plane security policy 1 and the protection level of the user plane security policy 2 are that security protection is not required, the terminal device A determines that the protection level of the security protection mode corresponding to the PC5 interface communications mode is that security protection is not required.

Alternatively, when both the protection level of the user plane security policy 1 and the protection level of the user plane security policy 2 are that security protection is preferred, or when one of the protection level of the user plane security policy 1 or the protection level of the user plane security policy 2 is that security protection is preferred and the other is that security protection is not required, the terminal device A determines the protection level of the security protection mode corresponding to the PC5 interface communications mode based on a security protection capability of the terminal device A.

In another implementation, either of the two pieces of security protection information in the Uu interface communications mode includes a user plane security protection mode, and that either of the terminal devices (the terminal device A is used as an example) determines the security protection mode corresponding to the PC5 interface communications mode based on the user plane security protection mode 1 and the user plane security protection mode 2 includes the following.

When at least one of the protection level of the user plane security protection mode 1 or the protection level of the user plane security protection mode 2 is that security protection is required, the terminal device A determines that the protection level of the security protection mode corresponding to the PC5 interface communications mode is that security protection is required.

Alternatively, when both the protection level of the user plane security protection mode 1 and the protection level of the user plane security protection mode 2 are that security protection is not required, the terminal device A determines that the protection level of the security protection mode corresponding to the PC5 interface communications mode is that security protection is not required.

In still another implementation, either of the two pieces of security protection information in the Uu interface communications mode includes a user plane security protection policy and a user plane security protection mode, and that either of the terminal devices (the terminal device A is used as an example) determines the security protection mode corresponding to the PC5 interface communications mode based on the user plane security policy 1 and the user plane security policy 2, and the user plane security protection mode 1 and the user plane security protection mode 2 includes the following methods.

Method 1: When the user plane security protection mode 1 is the same as the user plane security protection mode 2, the terminal device A determines that the security protection mode corresponding to the PC5 interface communications mode is the same as the user plane security protection mode 1; or when the user plane security protection mode 1 is different from the user plane security protection mode 2, the terminal device A determines the security protection mode corresponding to the PC5 interface communications mode based on the user plane security policy 1 and the user plane security policy 2.

Method 2: When at least one of the protection level of the user plane security protection mode 1 or the protection level of the user plane security protection mode 2 is that security protection is required, the terminal device A determines that the protection level of the security protection mode corresponding to the PC5 interface communications mode is that security protection is required; or when both the user plane security protection mode 1 and the user plane security protection mode 2 are that security protection is not required, the terminal device A determines the security protection mode corresponding to the PC5 interface communications mode based on the user plane security policy 1 and the user plane security policy 2.

Method 3: When the protection level of the user plane security protection mode 2 is that security protection is required, and the protection level of the user plane security protection mode 1 is that security protection is required, the terminal device A determines that the protection level of the security protection mode corresponding to the PC5 interface communications mode is that security protection is required; or when the protection level of the user plane security protection mode 2 is that security protection is required, and the protection level of the user plane security protection mode 1 is that security protection is not required, the terminal device A determines the protection level of the security protection mode corresponding to the PC5 interface communications mode through a network device; or when the protection level of the user plane security protection mode 2 is that security protection is not required, and the protection level of the user plane security protection mode 1 is that security protection is required, the terminal device A determines that the protection level of the security protection mode corresponding to the PC5 interface communications mode is that security protection is required; or when the protection level of the user plane security protection mode 2 is that security protection is not required, and the protection level of the user plane security protection mode 1 is that security protection is not required, the terminal device A determines the security protection mode corresponding to the PC5 interface communications mode based on the user plane security policy 1 and the user plane security policy 2.

In the foregoing methods, for details about determining, by the terminal device A, the security protection mode corresponding to the PC5 interface communications mode based on the user plane security policy 1 and the user plane security policy 2, refer to the descriptions in the foregoing implementations. Details are not described herein again.

Instance 4

Figure 5:
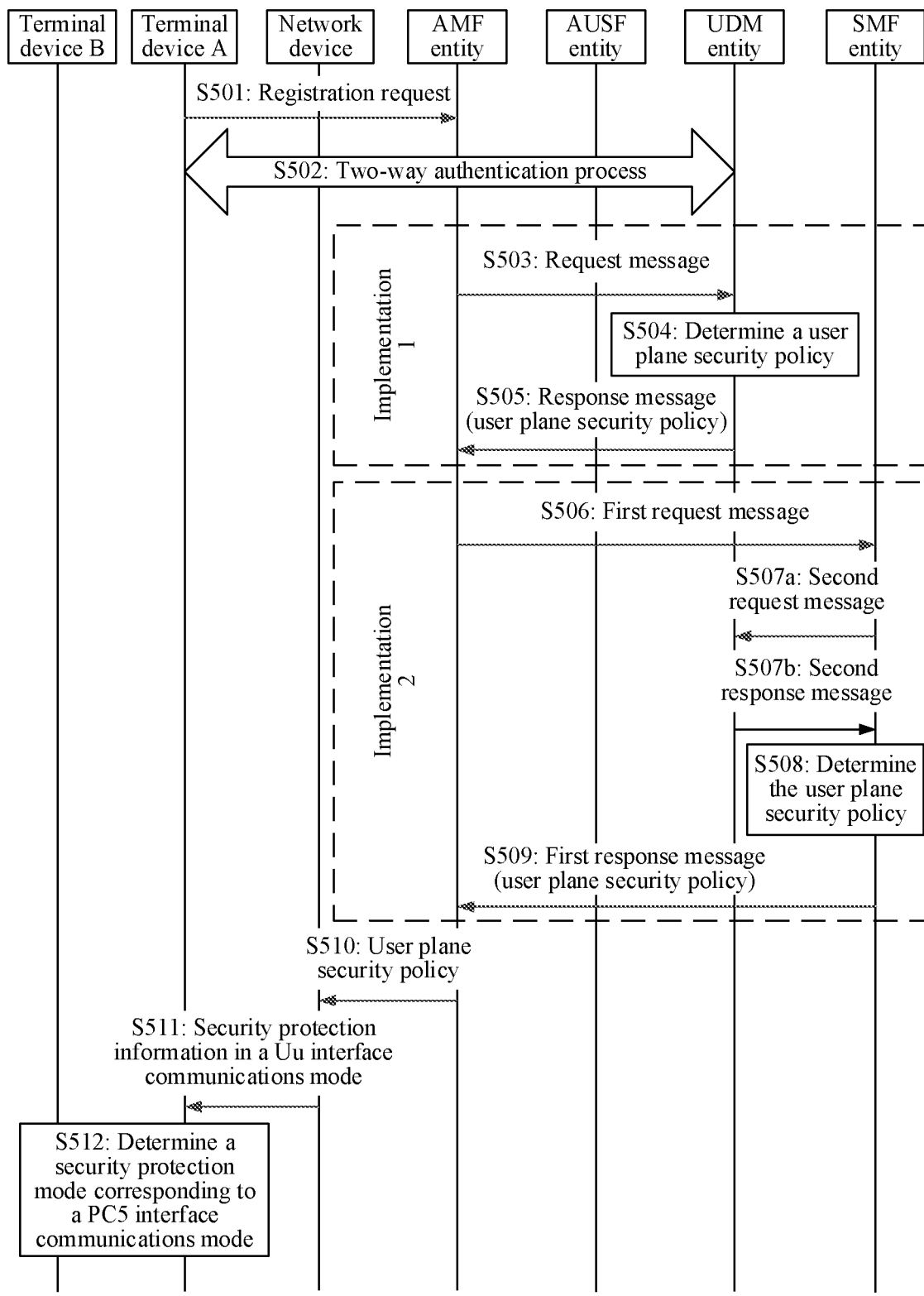
FIG. 5 is a flowchart of an instance for determining a security protection mode according to an embodiment of this application.

Referring to FIG. 5, this instance may include the following steps.

S501: A terminal device A sends a registration request to an AMF entity through a network device. The registration request may include a subscription concealed identifier (SUCI) of the terminal device A. The SUCI is an encrypted SUPI.

Optionally, the registration request may further include at least one or a combination of the following: PC5 capability information, an application identifier (for example, a V2X application ID), a DNN, S-NSSAI, and the like.

The PC5 capability information is used to notify the AMF entity that the current registration procedure is related to a PC5 interface, and the AMF entity needs to determine a user plane security policy in the registration procedure.

S502: The terminal device A performs a two-way authentication process with a network. This process is an existing technology, and network participating network elements include the AMF entity, an AUSF entity, and a UDM entity. In the authentication process, the AMF entity may obtain the SUPI based on the SUCI.

In this instance, the AMF entity may determine the user plane security policy in the following two implementations.

Implementation 1

S503: The AMF entity sends a request message to the UDM entity. The request message is used to request the user plane security policy from the terminal device A. The request message includes at least one of an SUPI, an application ID, a DNN, or S-NSSAI.

S504: After receiving the request message, the UDM entity determines the user plane security policy based on a parameter included in the request message.

In an example, the UDM entity may determine, in a conventional manner, the user plane security policy that the terminal device A subscribes to.

In another example, the UDM entity may obtain an application security policy from an application server by sending a request, and determine the user plane security policy based on the application security policy. For example, the UDM entity may determine that the user plane security policy is the same as the application security policy, or may determine a final user plane security policy based on the application security policy and the user plane security policy that is subscribed to. For a process in which the UDM entity determines the final user plane security policy, refer to the process in which the SMF entity determines the user plane security policy in the instance shown in FIG. 4. Details are not described herein again.

In this example, in a process in which the UDM entity requests the application security policy from the application server, the UDM entity may directly perform communicative interaction with the application server, or the UDM entity performs communicative interaction with the application server across another network element. This is not limited in this application.

S505: The UDM entity sends a response message to the AMF entity. The response message includes the determined user plane security policy.

Implementation 2

S506: The AMF entity sends a first request message to an SMF entity.

The first request message includes at least one of an SUPI, an application ID, a DNN, or S-NSSAI.

S507a: The SMF entity sends a second request message to the UDM entity. The second request message includes at least one of an SUPI, an application ID, a DNN, or S-NSSAI.

S507b: The UDM entity searches, based on a parameter included in the second request message, locally stored user plane security policies for the user plane security policy that the terminal device subscribes to. If the user plane security policy is found, the UDM entity sends, to the SMF entity, a second response message carrying the user plane security policy; or if the user plane security policy is not found, the UDM entity notifies the SMF through a second response message or in another manner.

Optionally, the UDM entity may alternatively obtain an application security policy from an application server, and determine the user plane security policy based on the application security policy. For a description, refer to the description in S504. Details are not described herein again.

S508: The SMF entity receives the second response message, and when the second response message includes a user plane security policy, determines that the user plane security policy is the user plane security policy of the terminal device A. Alternatively, when the SMF entity obtains no user plane security policy from the UDM entity, the SMF entity may determine the user plane security policy of the terminal device A from the locally stored user plane security policies based on at least one of the SUPI, the application ID, the DNN, or the S-NSSAI. Alternatively, when the SMF entity obtains no user plane security policy from the UDM entity, the SMF entity may obtain an application security policy from an application server, and determine the final user plane security policy based on the application security policy. For a process, refer to the description of determining the user plane security policy by the SMF entity in the embodiment shown in FIG. 4. Details are not described herein again.

S509: The SMF entity sends a first response message to the AMF entity. The first response message carries the user plane security policy determined by the SMF entity.

Implementation 3

Alternatively, the AMF entity may obtain an application security policy from an application server and determine the final user plane security policy based on the previously determined user plane security policy obtained from the SMF entity. For a process, refer to the foregoing description of determining the final user plane security policy by the UDM entity.

S510: The AMF entity sends the user plane security policy to the network device.

S511: The network device sends security protection information in a Uu interface communications mode to the terminal device A. The security protection information includes the user plane security protection mode and/or the user plane security policy.

S512: The terminal device A determines a security protection mode corresponding to a PC5 interface communications mode based on the security protection information in the Uu interface communications mode. For a process, refer to the descriptions in the instance 1 to the instance 3. Details are not described herein again.

Instance 5

In this instance, a terminal device A and a terminal device B transmit data in a PC5 interface communications mode, and protect the transmitted data in a security protection mode 1. Both the terminal device A and the terminal device B maintain the security protection mode 1. Optionally, the security protection mode 1 may be determined using the method in the foregoing instance, or may be determined based on an application security policy obtained locally or from an application server. This is not limited in this application.

Figure 6:
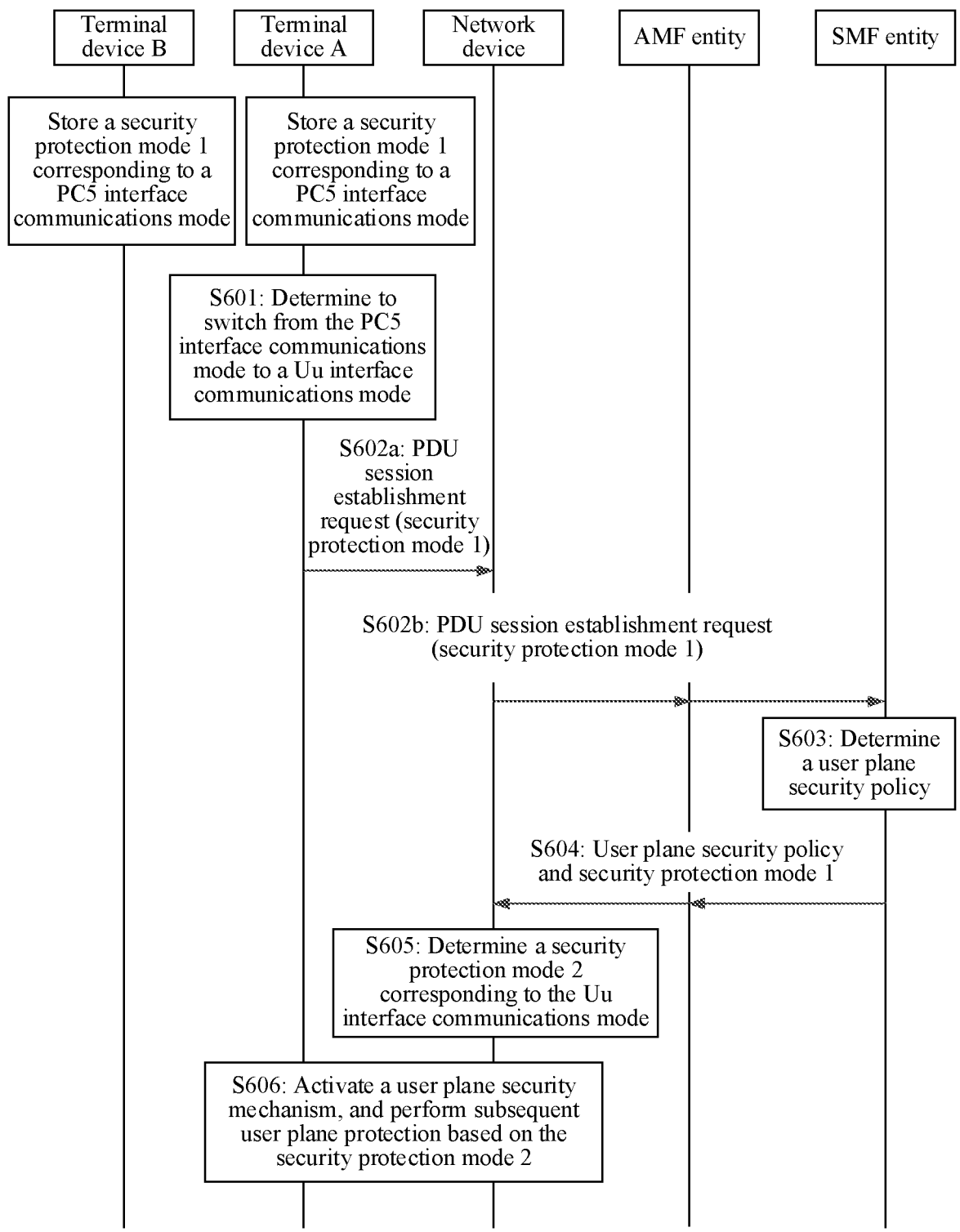
FIG. 6 is a flowchart of an instance for determining a security protection mode according to an embodiment of this application.

Referring to FIG. 6, this instance may include the following steps.

S601: The terminal device A determines to switch from the PC5 interface communications mode to a Uu interface communications mode.

S602a: The terminal device A sends a PDU session establishment request to a network device. The PDU session establishment request includes the security protection mode 1.

S602b: The network device sends the PDU session establishment request to the SMF entity through an AMF entity. The PDU session establishment request includes the security protection mode 1.

In another implementation, the terminal device A may send, to an AMF entity, an NAS message carrying the security protection mode 1, and then the AMF entity sends the security protection mode 1 to an SMF entity.

S603: In an implementation, the SMF entity determines a user plane security policy. For a process, refer to S203 and S204 in the figure. Details are not described herein again. In another implementation, the SMF entity may obtain an application security policy from an application server, and determine a user plane security policy based on the application security policy. For a process, refer to the description of determining the user plane security policy by the SMF entity in the instance shown in FIG. 2. Details are not described herein again.

S604: The SMF entity sends the user plane security policy and the security protection mode 1 to the network device.

S605: The network device determines a security protection mode 2 corresponding to the Uu interface communications mode based on the user plane security policy and the security protection mode 1.

In this instance, the network device may determine the security protection mode 2 in a plurality of implementations.

In an implementation, the network device directly determines the security protection mode 2 based on the user plane security policy and the security protection mode 1 according to a strongest principle, to ensure that a protection level of the security protection mode 2 is not lower than a protection level of the user plane security policy and a protection level of the security protection mode 1.

In another implementation, the network device first determines a user plane security protection mode based on the user plane security policy, and then determines the security protection mode 2 based on the determined user plane security protection mode and the security protection mode 1. A protection level of the second security protection mode 2 is not lower than a protection level of the user plane security protection mode and a protection level of the security protection mode 1.

In another implementation, the foregoing steps of determining and sending the user plane security policy are optional. After obtaining the security protection mode 1 from the terminal device A, the network device uses the security protection mode 1 as the security protection mode 2.

S606: The network device activates a user plane security mechanism, and performs user plane protection on subsequently transmitted user plane data of the terminal device A based on the determined security protection mode 2.

Instance 6

In this instance, a terminal device A and a terminal device B transmit data in a PC5 interface communications mode, and protect the transmitted data in a security protection mode 1. Both the terminal device A and the terminal device B maintain the security protection mode 1. For a procedure, refer to the embodiment shown in FIG. 6. A difference lies in that, after the terminal device A sends the security protection mode 1 to a network device in S602a, that the network device sends a PDU session establishment request including the security protection mode 1 to an SMF entity is optional. Correspondingly, that the SMF entity sends the security protection mode 1 to the network device in S604 is also optional.

The network device may determine a security protection mode 2 in the following implementations in S605.

In an implementation, the network device determines that the security protection mode 2 is the same as the security protection mode 1.

In another implementation, the network device determines that a protection level of the security protection mode 2 is higher than a protection level of the security protection mode 1.

In still another implementation, the terminal device determines the security protection mode 2 based on the user plane security policy obtained in S604 and the security protection mode 1. A protection level of the security protection mode 2 is not lower than a protection level of the user plane security policy and a protection level of the security protection mode 1.

Instance 7

In this instance, a terminal device A and a terminal device B transmit data in a PC5 interface communications mode, and protect the transmitted data in a security protection mode 1. Both the terminal device A and the terminal device B maintain the security protection mode 1. For a procedure, refer to the embodiment shown in FIG. 6. A difference lies in that, when performing S602a, the terminal device A does not use the PDU session establishment request to carry the security protection mode 1, but sends the security protection mode 1 to an application server in advance. The SMF entity may obtain the security protection mode 1 from the application server. When performing S604, the SMF entity may send both the user plane security policy and the security protection mode 1 to the network device.

Optionally, the terminal device A may send, to the application server, both the security protection mode 1 and at least one of the following: a carrier network identifier of a UE, a generic public subscription identifier (GPSI), an application ID, an application ID of the UE, a carrier network ID of the UE, or a PC5 link identifier. In this way, the application server sends both the foregoing parameter and the security protection mode 1 to the SMF entity.

When determining to perform communications mode switching, the terminal device A may send at least one of the application ID, the application ID of the UE, the carrier network ID of the UE, or the PC5 link identifier to the SMF entity, for example, use the PDU session establishment request to carry the foregoing parameter. When the SMF entity receives at least one of the application ID, the application ID of the UE, the carrier network ID of the UE, or the PC5 link identifier that are sent by the terminal device, the SMF entity may determine the security protection mode 1 based on the parameter.

Instance 8

Based on the steps in the foregoing instances 5 to 7, a case in which the terminal device A and the terminal device B further store an application security policy in the PC5 interface communications mode is as follows.

In an implementation, the terminal device A may send both the security protection mode 1 and the application security policy. In this way, when determining the security protection mode 2, the network device may refer to the application security policy. A protection level of the security protection mode 2 is not lower than a protection level of the application security policy.

In another implementation, the security protection mode 1 in the instances may be replaced with the application security policy.

Instance 9

In this instance, a terminal device A and a terminal device B separately transmit data in a Uu interface communications mode. The terminal device A stores security protection information 1 in the Uu interface communications mode, and the terminal device B stores security protection information 2 in the Uu interface communications mode. The security protection information 1 includes a security protection mode 1 and/or a user plane security policy 1, and the security protection information 2 includes a security protection mode 2 and/or a user plane security policy 2.

Figure 7:
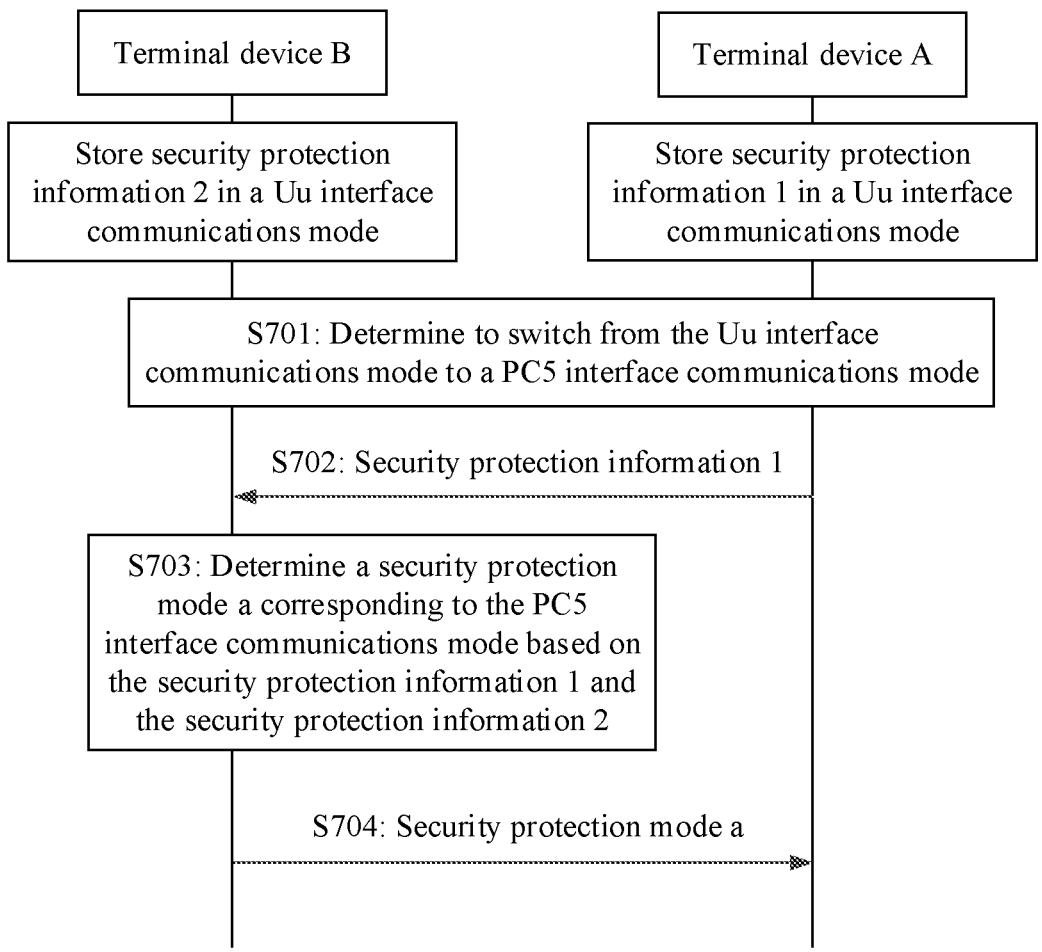
FIG. 7 is a flowchart of an instance for determining a security protection mode according to an embodiment of this application.

Referring to FIG. 7, this instance may include the following steps.

S701: The terminal device A and the terminal device determine to switch from the Uu interface communications mode to a PC5 interface communications mode.

S702: The terminal device A sends the security protection information 1 to the terminal device B.

For example, the terminal device A may send the security protection information 1 through broadcast.

For example, the terminal device A may determine, in a conventional manner such as device-to-device communication discovery, that the terminal device B is a peer device of the terminal device A when the terminal device A uses the PC5 interface communications mode.

For example, the terminal device A may determine, through information entered by a user, that the terminal device B is a peer device of the terminal device A when the terminal device A uses the PC5 interface communications mode.

S703: The terminal device B determines a security protection mode a corresponding to the PC5 interface communications mode based on the received security protection information 1 and the locally stored security protection information 2. It should be noted that a protection level of the security protection mode a is not lower than a protection level of the security protection information 1 and a protection level of the security protection information 2. For a determining process, refer to the descriptions in the foregoing embodiment and the instance 3. Details are not described herein again.

S704: The terminal device B sends the security protection mode a to the terminal device A, and protects, in the security protection mode a, data transmitted between the terminal device A and the terminal device B.

Instance 10

Based on the procedure in the foregoing instance, in this instance, a network device or a terminal device may determine a final security protection mode based on a user plane security policy or an application security policy, without a need to consider security protection modes corresponding to different communications modes. In this way, a security protection capability of a device can be better referenced in this method.

Instance 11

Based on the procedure in the foregoing instance, in this instance, a network device or a terminal device may determine, based on a priority, whether to use a user plane security policy or an application security policy to determine a final security protection mode. For example, if an application security policy exists, determining is performed based only on the application security policy. Alternatively, if a user plane security policy exists, determining is performed based only on the user plane security policy.

Instance 12

In this instance, a terminal device A and a terminal device B separately transmit data in a PC5 interface communications mode. The terminal device A stores security protection information 1, and the terminal device B stores security protection information 2. The security protection information 1 includes a security protection mode 1 and/or a user plane security policy 1, and the security protection information 2 includes a security protection mode 2 and/or a user plane security policy 2. The security protection information 1 and the security protection information 2 herein may be preset, or may be indicated to the terminal by an application or a service, or may be obtained in another manner. This is not limited.

The terminal device A may further store a service identifier 1, and the security protection information 1 herein is related to the service identifier 1. The terminal device A may further store an application identifier 1, and the security protection information 1 herein is related to the application identifier 1.

The terminal device B may further store a service identifier 1, and the security protection information 2 herein is related to the service identifier 1. The terminal device A may further store an application identifier 1, and the security protection information 2 herein is related to the application identifier 1.

This instance may include the following steps.

The terminal device A sends the security protection information 1 to the terminal device B.

For example, the terminal device A may send the security protection information 1 through broadcast.

For example, the terminal device A may determine, in a conventional manner such as device-to-device communication discovery, that the terminal device B is a peer device of the terminal device A when the terminal device A uses the PC5 interface communications mode.

For example, the terminal device A may determine, through information entered by a user, that the terminal device B is a peer device of the terminal device A when the terminal device A uses the PC5 interface communications mode.

Optionally, in addition to the security protection information 1, the terminal device A further sends the service identifier 1.

Optionally, in addition to the security protection information 1, the terminal device A further sends the application identifier 1.

The terminal device B determines a security protection mode a corresponding to the PC5 interface communications mode based on the received security protection information 1 and the locally stored security protection information 2. It should be noted that a protection level of the security protection mode a is not lower than a protection level of the security protection information 1 and a protection level of the security protection information 2. For a method for determining the security protection mode corresponding to the PC5 interface based on the security protection information 1 and the locally stored security protection information 2, refer to the descriptions in the foregoing embodiment and the instance 3. Details are not described herein again.

Optionally, the terminal device B further receives the service identifier 1 sent by the terminal device A, and determines the locally stored security protection information 2 based on the service identifier 1.

Optionally, the terminal device B further receives the application identifier 1 sent by the terminal device A, and determines the locally protected security protection information 2 based on the application identifier 1.

The terminal device B sends the security protection mode a to the terminal device A, and protects, in the security protection mode a, data transmitted between the terminal device A and the terminal device B.

Optionally, in addition to the security protection mode a, the terminal device B further sends the service identifier 1.

Optionally, in addition to the security protection mode a, the terminal device B further sends the application identifier 1.

Optionally, in addition to the security protection mode a, the terminal device B further sends the security protection information 1 and/or the security protection information 2.

For the procedures of all the instances in this application, determining of a security protection mode between terminal devices is not limited to a scenario of switching between two access modes. The two terminals can also negotiate with each other based on locally stored security protection information.

For the procedures of all the instances in this application, a security protection mode between terminal devices may also be determined based on security protection information of one of the terminal devices. For example, the terminal device A sends security protection information 1, and the terminal device B determines a security protection mode between the terminal device A and the terminal device B based on the security protection information 1. Alternatively, the terminal device A sends a communication request, and the terminal device B determines a security protection mode between the terminal device A and the terminal device B based on security protection information 2. Alternatively, the terminal device A sends a communication request, the terminal device B sends security protection information 2 to the terminal device A, and the terminal device A determines a security protection mode between the terminal device A and the terminal device B based on the security protection information 2. This is not limited.

For the procedures of all the instances in this application, after a security protection mode between terminal devices is determined, the terminal device B sends security protection information 1 to the terminal device A, such that the terminal device A can check whether the previously sent security protection information 1 is consistent with security protection information 2 received from the terminal device B. If the security protection information 1 is inconsistent with the security protection information 2, optionally, the terminal device A sends a reject message to the terminal device B, or interrupts communication. This is not limited. Alternatively, the terminal device B sends security protection information 2 to the terminal device A, such that the terminal device A determines content of the security protection information 2. Optionally, the security protection information 1 and/or the security protection information 2 that are/is sent by the terminal device B herein need/needs to support integrity protection, to prevent the security protection information 1 and/or the security protection information 2 from being modified by another attacker.

The service identifier and/or the application identifier that are/is described in the instance 12 are/is also applicable to another embodiment instance of this application. For example, the sent security protection information is related to the service identifier or the application identifier. Therefore, the protection mode obtained through negotiation is also consistent with the service identifier or the application identifier. The protection mode obtained through negotiation is also applicable to a session granularity, a bearer granularity, a flow granularity, a slice granularity, or the like between terminals.

Figure 8:
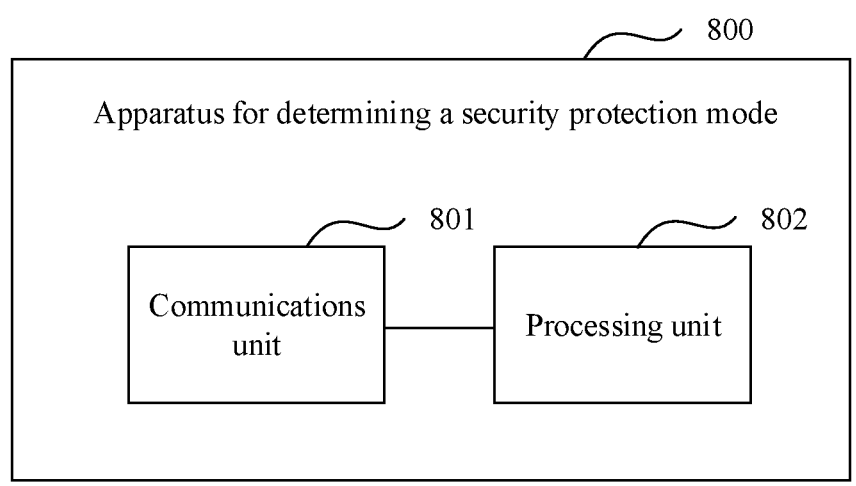
FIG. 8 is a structural diagram of an apparatus for determining a security protection mode according to an embodiment of this application.
Figure 9:
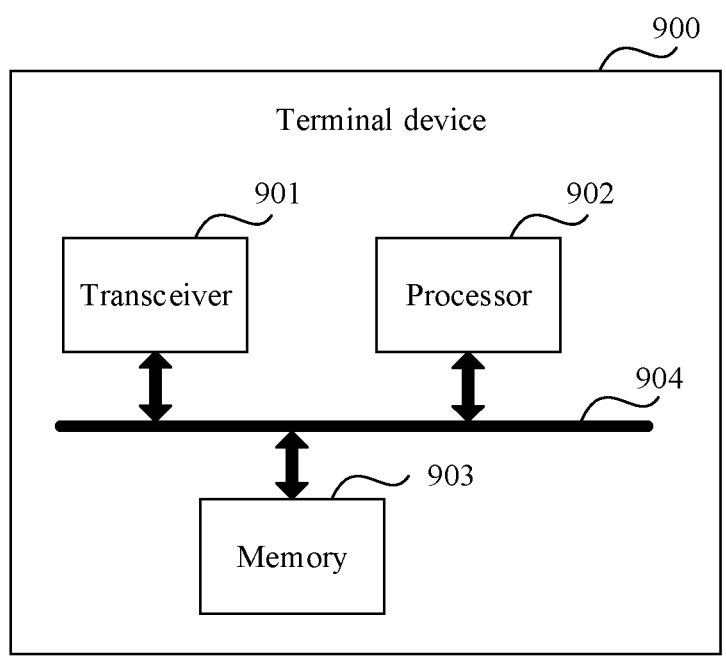
FIG. 9 is a structural diagram of a terminal device according to an embodiment of this application.

In addition, it should be noted that, for a structure of the terminal device A or the terminal device B in the instance 12, refer to the structure shown in FIG. 8 or FIG. 9. The method shown in the instance 12 may be performed using the structure shown in FIG. 8 or FIG. 9.

Based on a same technical concept, an embodiment of this application further provides an apparatus for determining a security protection mode. The apparatus may be applied to the terminal device in the communications system shown in FIG. 1, and may implement the method for determining a security protection mode in the foregoing embodiment. Referring to FIG. 8, a structure of the apparatus includes a communications unit 801 and a processing unit 802. The following describes functions of the units using an example in which the terminal device to which the apparatus is applied is a first terminal device.

The communications unit 801 is configured to receive and send data.

The processing unit 802 is configured to perform the following steps through the communications unit 801: obtaining security protection information in a first communications mode, where the security protection information includes a first security protection mode and/or a first security policy, the first security protection mode corresponds to the first communications mode, and is used to protect data transmitted by the first terminal device in the first communications mode, and the first security policy is a security policy of the first terminal device in the first communications mode; and determining a second security protection mode based on the security protection information, where the second security protection mode corresponds to a second communications mode, and is used to protect data transmitted by the first terminal device in the second communications mode.

In a possible implementation, when the security protection information is the first security protection mode, when determining the second security protection mode based on the security protection information, the processing unit 802 is configured to: determine that the second security protection mode is the same as the first security protection mode; or obtain a second security policy, where the second security policy is a security policy of the first terminal device in the second communications mode; and determine the second security protection mode based on the second security policy and the first security protection mode, where a protection level of the second security protection mode is not lower than a protection level of the second security policy, and is not lower than a protection level of the first security protection mode.

In a possible implementation, when determining the second security protection mode based on the second security policy and the first security protection mode, the processing unit 802 is configured to: when the protection level of the first security protection mode is that security protection is required, determine that the protection level of the second security protection mode is that security protection is required; or when the protection level of the first security protection mode is that security protection is not required, and the protection level of the second security policy is that security protection is required, determine that the protection level of the second security protection mode is that security protection is required; or when the protection level of the first security protection mode is that security protection is not required, and the protection level of the second security policy is that security protection is preferred, determine the protection level of the second security protection mode based on a security protection capability of the processing unit 802; or when the protection level of the first security protection mode is that security protection is not required, and the protection level of the second security policy is that security protection is not required, determine that the protection level of the second security protection mode is that security protection is not required.

In a possible implementation, when the security protection information is the first security policy, when determining the second security protection mode based on the security protection information, the processing unit 802 is configured to: determine the second security protection mode based on the first security policy; or obtain a second security policy, where the second security policy is a security policy of the first terminal device in the second communications mode; and determine the second security protection mode based on the second security policy and the first security policy, where a protection level of the second security protection mode is not lower than a protection level of the second security policy, and is not lower than a protection level of the first security policy.

In a possible implementation, when determining the second security protection mode based on the second security policy and the first security policy, the processing unit 802 is configured to: when the protection level of the second security policy is that security protection is required, determine that the protection level of the second security protection mode is that security protection is required; or when the protection level of the second security policy is that security protection is preferred or security protection is not required, determine the protection level of the second security protection mode based on the protection level of the first security policy.

In a possible implementation, when determining the second security protection mode based on the first security policy, the processing unit 802 is configured to: when the protection level of the first security policy is that security protection is required, determine that the protection level of the second security protection mode is that security protection is required; or when the protection level of the first security policy is that security protection is preferred, determine the protection level of the second security protection mode based on a security protection capability of the processing unit 802; or when the protection level of the first security policy is that security protection is not required, determine that the protection level of the second security protection mode is that security protection is not required.

In a possible implementation, the processing unit 802 is further configured to: after determining the second security protection mode, send the second security protection mode to a second terminal device through the communications unit 801, and receive, through the communications unit 801, a fourth security protection mode determined by the second terminal device based on the second security protection mode and a third security protection mode; or after determining the second security protection mode, receive, through the communications unit 801, a third security protection mode sent by a second terminal device, and determine a fourth security protection mode based on the second security protection mode and the third security protection mode, where a protection level of the fourth security protection mode is not lower than the protection level of the second security protection mode, and is not lower than a protection level of the third security protection mode, the third security protection mode is used to protect data transmitted by the second terminal device in the second communications mode, and the fourth security protection mode is used to protect data transmitted between the first terminal device and the second terminal device in the second communications mode.

In a possible implementation, when determining a fourth security protection mode based on the second security protection mode and the third security protection mode, the processing unit 802 is configured to: when at least one of the protection level of the second security protection mode or the protection level of the third security protection mode is that security protection is required, determine that the protection level of the fourth security protection mode is that security protection is required; or when both the protection level of the second security protection mode and the protection level of the third security protection mode are that security protection is not required, determine that the protection level of the fourth security protection mode is that security protection is not required.

In a possible implementation, when the security protection information is the first security policy, the second security protection mode is used to protect data transmitted between the first terminal device and a second terminal device in the second communications mode. When determining the second security protection mode based on the security protection information, the processing unit 802 is configured to: send the first security policy to the second terminal device through the communications unit 801, and receive, through the communications unit 801, the second security protection mode determined by the second terminal device based on the first security policy and a third security policy; or receive, through the communications unit 801, the third security policy sent by the second terminal device, and determine the second security protection mode based on the first security policy and the third security policy, where a protection level of the second security protection mode is not lower than a protection level of the first security policy, and is not lower than a protection level of the third security policy, and the third security policy is a protection level of the second terminal device in the first communications mode.

In a possible implementation, when determining the second security protection mode based on the first security policy and the third security policy, the processing unit 802 is configured to: when at least one of the protection level of the first security policy or the protection level of the third security policy is that security protection is required, determine that the protection level of the second security protection mode is that security protection is required; or when both the protection level of the first security policy and the protection level of the third security policy are that security protection is not required, determine that the protection level of the second security protection mode is that security protection is not required; or when both the protection level of the first security policy and the protection level of the second security policy are that security protection is preferred, or when one of the protection level of the first security policy or the protection level of the third security policy is that security protection is preferred and the other is that security protection is not required, determine the protection level of the second security protection mode based on a security protection capability of the processing unit 802.

In a possible implementation, when obtaining the security protection information in the first communications mode, the processing unit 802 is configured to: obtain the security protection information in the first communications mode when determining to switch from the first communications mode to the second communications mode.

In a possible implementation, when the second communications mode is a Uu interface communications mode, when determining the second security protection mode based on the security protection information, the processing unit 802 is configured to: send the security protection information to a network device through the communications unit 801, and receive the second security protection mode from the network device through the communications unit 801, where the second security protection mode is determined by the network device based on the security protection information; or send the security protection information to an application server and send a request message to a network device through the communications unit 801, and receive the second security protection mode from the network device through the communications unit 801, where the second security protection mode is determined by the network device based on the security protection information obtained from the application server.

In a possible implementation, when the security protection information includes the first security protection mode, the second security protection mode is the same as the first security protection mode; or a protection level of the second security protection mode is higher than a protection level of the first security protection mode; or the second security protection mode is determined by the network device based on the first security protection mode and/or a second security policy, where the second security policy is a protection level that is obtained by the network device and that is used when the first terminal device uses the second communications mode; or the second security protection mode is determined by the network device based on the first security protection mode and a third security protection mode, where the third security protection mode is determined by the network device based on the second security policy.

In a possible implementation, when a protection level of the second security policy is that security protection is required, the protection level of the second security protection mode is that security protection is required.

Alternatively, when a protection level of the second security policy is that security protection is preferred, and the protection level of the first security protection mode is that security protection is required, the protection level of the second security protection mode is that security protection is required.

Alternatively, when a protection level of the second security policy is that security protection is preferred, and the protection level of the first security protection mode is that security protection is not required, the protection level of the second security protection mode is specified by the network device.

Alternatively, when a protection level of the second security policy is that security protection is not required, and the protection level of the first security protection mode is that security protection is required, the protection level of the second security protection mode is that security protection is required.

Alternatively, when a protection level of the second security policy is that security protection is not required, and the protection level of the first security protection mode is that security protection is not required, the protection level of the second security protection mode is that security protection is not required.

In a possible implementation, when a protection level of the third security protection mode is that security protection is required, the protection level of the second security protection mode is that security protection is required.

Alternatively, when a protection level of the third security protection mode is that security protection is not required, and the protection level of the first security protection mode is that security protection is required, the protection level of the second security protection mode is that security protection is required.

Alternatively, when a protection level of the third security protection mode is that security protection is not required, and the protection level of the first security protection mode is that security protection is not required, the protection level of the second security protection mode is that security protection is not required.

In a possible implementation, when the second communications mode is a PC5 interface communications mode, the second security protection mode is used to protect data transmitted between the first terminal device and a second terminal device in the second communications mode. When determining the second security protection mode based on the security protection information, the processing unit 802 is configured to: when the security protection information includes the first security protection mode, send the first security protection mode to the second terminal device through the communications unit 801, and receive the second security protection mode from the second terminal device through the communications unit 801, where the second security protection mode is determined by the second terminal device based on the first security protection mode and a third security protection mode, and a protection level of the second security protection mode is not lower than a protection level of the first security protection mode, and is not lower than a protection level of the third security protection mode; or when the security protection information includes the first security protection mode, receive a third security protection mode from the second terminal device through the communications unit 801, and determine the second security protection mode based on the first security protection mode and the third security protection mode, where a protection level of the second security protection mode is not lower than a protection level of the first security protection mode, and is not lower than a protection level of the third security protection mode; or when the security protection information includes the first security protection mode and the first security policy, send the first security protection mode and the first security policy to the second terminal device through the communications unit 801, and receive the second security protection mode from the second terminal device through the communications unit 801, where the second security protection mode is determined by the second terminal device based on the first security protection mode, the first security policy, a third security protection mode, and a second security policy; and when the first security protection mode is the same as the third security protection mode, the second security protection mode is the same as the first security protection mode; or when the first security protection mode is different from the third security protection mode, a protection level of the second security protection mode is not lower than a protection level of the first security protection mode and a protection level of the second security protection mode, and is not lower than a protection level of the first security policy and a protection level of the second security policy; or when the security protection information includes the first security protection mode and the first security policy, receive a third security protection mode and a second security policy from the second terminal device through the communications unit 801, and determine the second security protection mode based on the first security protection mode, the first security policy, the third security protection mode, and the second security policy, where when the first security protection mode is the same as the third security protection mode, the second security protection mode is the same as the first security protection mode; or when the first security protection mode is different from the third security protection mode, a protection level of the second security protection mode is not lower than a protection level of the first security protection mode and a protection level of the second security protection mode, and is not lower than a protection level of the first security policy and a protection level of the second security policy, where the third security protection mode is used to protect data transmitted by the second terminal device in the first communications mode, and the second security policy is a security policy of the second terminal device in the first communications mode.

In a possible implementation, when determining the second security protection mode based on the first security protection mode and the third security protection mode, the processing unit 802 is configured to: when the protection level of the third security protection mode is that security protection is required, and the protection level of the first security protection mode is that security protection is required, determine that the protection level of the second security protection mode is that security protection is required; or when the protection level of the third security protection mode is that security protection is required, and the protection level of the first security protection mode is that security protection is not required, determine the protection level of the second security protection mode through a network device; or when the protection level of the third security protection mode is that security protection is not required, and the protection level of the first security protection mode is that security protection is required, determine that the protection level of the second security protection mode is that security protection is required; or when the protection level of the third security protection mode is that security protection is not required, and the protection level of the first security protection mode is that security protection is not required, determine that the protection level of the second security protection mode is that security protection is not required.

In a possible implementation, when determining the second security protection mode based on the first security protection mode, the first security policy, the third security protection mode, and the second security policy, the processing unit 802 is configured to: when the first security protection mode is the same as the third security protection mode, determine that the second security protection mode is the first security protection mode; or when the first security protection mode is different from the third security protection mode, determine the second security protection mode based on the first security policy and the second security policy.

In a possible implementation, when determining the second security protection mode based on the first security protection mode, the first security policy, the third security protection mode, and the second security policy, the processing unit 802 is configured to: when the protection level of the third security protection mode is that security protection is required, and the protection level of the first security protection mode is that security protection is required, determine that the protection level of the second security protection mode is that security protection is required; or when the protection level of the third security protection mode is that security protection is required, and the protection level of the first security protection mode is that security protection is not required, determine the protection level of the second security protection mode through a network device; or when the protection level of the third security protection mode is that security protection is not required, and the protection level of the first security protection mode is that security protection is required, determine that the protection level of the second security protection mode is that security protection is required; or when the protection level of the third security protection mode is that security protection is not required, and the protection level of the first security protection mode is that security protection is not required, determine the second security protection mode based on the first security policy and the second security policy.

In a possible implementation, when determining the second security protection mode based on the first security policy and the second security policy, the processing unit 802 is configured to: when at least one of the protection level of the first security policy or the protection level of the second security policy is that security protection is required, determine that the protection level of the second security protection mode is that security protection is required; or when both the protection level of the first security policy and the protection level of the second security policy are that security protection is not required, determine that the protection level of the second security protection mode is that security protection is not required; or when both the protection level of the first security policy and the protection level of the second security policy are that security protection is preferred, or when one of the protection level of the first security policy or the protection level of the third security policy is that security protection is preferred and the other is that security protection is not required, determine the protection level of the second security protection mode based on a security protection capability of the processing unit 802.

In a possible implementation, the foregoing security policy includes a confidentiality protection requirement and/or an integrity protection requirement, and the foregoing security protection mode includes a confidentiality protection requirement and/or an integrity protection requirement.

According to the apparatus for determining a security protection mode provided in this embodiment of this application, the terminal device may determine the security protection mode corresponding to the second communications mode based on the security protection information in the first communications mode. In this way, when switching from the first communications mode to the second communications mode, the terminal device may directly use the security protection mode corresponding to the second communications mode to protect transmitted data, in order to ensure data security of the terminal device after communications mode switching is performed. Further, the protection level that is of the security protection mode corresponding to the second communications mode and that is determined by the terminal device is not lower than the protection level of the security protection information in the first communications mode. In this way, data security of the terminal device after communications mode switching is performed can be further ensured.

It should be noted that in the embodiments of this application, division into the modules is an example and is merely logical function division, and may be other division during actual implementation. In addition, function units in the embodiments of this application may be integrated into one processing unit, or may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to other approaches, or all or some of the technical solutions may be implemented in the form of a software product. The computer software product is stored in a storage medium and includes several instructions for instructing a computer device (which may be a personal computer, a server, a network device, or the like) or a processor to perform all or some of the steps of the methods in the embodiments of this application. The foregoing storage medium includes the following. any medium that can store program code, such as a Universal Serial Bus (USB) flash drive, a removable hard disk, a read-only memory (ROM), a random access memory (RAM), a magnetic disk, or an optical disc.

Based on a same technical concept, an embodiment of this application further provides a terminal device. The terminal device may be applied to the communications system shown in FIG. 1, has a function of the apparatus for determining a security protection mode shown in FIG. 8, and can implement the method for determining a security protection mode in the foregoing embodiment. As shown in FIG. 9, the terminal device 900 includes a transceiver 901 and a processor 902. Optionally, the terminal device 900 further includes a memory 903. The transceiver 901, the processor 902, and the memory 903 are connected to each other.

Optionally, the transceiver 901, the processor 902, and the memory 903 are connected to each other using a bus 904. The bus 904 may be a peripheral component interconnect (PCI) bus, an Extended Industry Standard Architecture (EISA) bus, or the like. The bus may be classified into an address bus, a data bus, a control bus, and the like. For ease of representation, only one thick line is used to represent the bus in FIG. 9, but this does not mean that there is only one bus or only one type of bus.

The transceiver 901 is configured to receive and send a signal, to implement communication with another device in the communications system. Optionally, the transceiver 901 may be implemented by a radio frequency apparatus and an antenna.

The processor 902 is configured to implement functions of the terminal device in the methods for determining a security protection mode in the foregoing figures. For details, refer to the descriptions in the foregoing embodiments. Details are not described herein again.

The processor 902 may be a central processing unit (CPU), a network processor (NP), a combination of a CPU and an NP, or the like. The processor 902 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof. The processor 902 may implement the foregoing functions by hardware or by hardware executing corresponding software.

The memory 903 is configured to store a program instruction and the like. For example, the program instruction may include program code, and the program code includes a computer operation instruction. The memory 903 may include a random access memory (RAM), or may include a non-volatile memory such as at least one magnetic disk memory. The processor 902 executes the program instruction stored in the memory 903, to implement the foregoing functions, in order to implement the method for determining a security protection mode provided in the foregoing embodiments.

Based on the foregoing embodiments, an embodiment of this application further provides a computer program. When the computer program is run on a computer, the computer is enabled to perform the method for determining a security protection mode provided in the foregoing embodiments.

Based on the foregoing embodiments, an embodiment of this application further provides a computer storage medium. The computer storage medium stores a computer program, and when the computer program is run on a computer, the computer is enabled to perform the method for determining a security protection mode provided in the foregoing embodiments.

Based on the foregoing embodiments, an embodiment of this application further provides a chip. The chip is configured to read a computer program stored in a memory, to implement the method for determining a security protection mode provided in the foregoing embodiments.

Based on the foregoing embodiments, an embodiment of this application further provides a chip system. The chip system includes a processor, configured to support a computer apparatus in implementing the method for determining a security protection mode provided in the foregoing embodiments. In a possible design, the chip system further includes a memory, and the memory is configured to store a program and data that are necessary for the computer apparatus. The chip system may include a chip, or may include a chip and another discrete device.

In conclusion, this application provides a method and an apparatus for determining a security protection mode. In the method, a terminal device may determine a security protection mode corresponding to a second communications mode based on security protection information in a first communications mode. In this way, when switching from the first communications mode to the second communications mode, the terminal device may directly use the security protection mode corresponding to the second communications mode to protect transmitted data, in order to ensure data security of the terminal device after communications mode switching is performed.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a compact disc (CD)-ROM, an optical memory, and the like) that include computer usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, such that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, such that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, such that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

It is clear that a person skilled in the art can make various modifications and variations to this application without departing from the spirit and scope of this application. This application is intended to cover these modifications and variations of this application provided that they fall within the scope of the following claims and their equivalent technologies.

What is claimed is:

1. A method, comprising:
   receiving, by an apparatus, first security protection information from a first terminal device via a PC5 communication interface between the first terminal device and a second terminal device, wherein the apparatus is the second terminal device or a chip in the second terminal device;
   setting, by the apparatus and based on the first security protection information of the first terminal device indicating that security protection is not needed and second security protection information of the second terminal device indicating that the security protection is not needed, a configuration of user plane confidentiality protection corresponding to the PC5 communication interface to off; and
   sending, by the apparatus and to the first terminal device, a message comprising the configuration of user plane confidentiality protection corresponding to the PC5 communication interface, wherein the message indicates that the configuration of user plane confidentiality protection is set to off.

2. The method of claim 1, further comprising:
   receiving, by the apparatus, an application identifier from the first terminal device; and
   determining, by the apparatus, the second security protection information based on the application identifier.

3. The method of claim 1, further comprising:
   receiving, by the apparatus, a service identifier from the first terminal device; and
   determining, by the apparatus, the second security protection information based on the service identifier.

4. The method of claim 1, wherein after receiving the first security protection information, the method further comprises determining, based on the first security protection information of the first terminal device and the second security protection information of the second terminal device, the configuration of the user plane confidentiality protection corresponding to the PC5 communication interface.

5. The method of claim 1, wherein the first security protection information of the first terminal device comprises a first security protection mode, and wherein the second security protection information of the second terminal device comprises a second security protection mode.

6. The method of claim 1, wherein the first security protection information of the first terminal device comprises a first user plane security policy, and wherein the second security protection information of the second terminal device comprises a second user plane security policy.

7. The method of claim 1, further comprising obtaining, from locally stored information, the second security protection information of the second terminal device.

8. The method of claim 1, further comprising obtaining, from an application server, the second security protection information of the second terminal device.

9. The method of claim 1, further comprising:
   switching from a UU interface communications mode to a PC5 interface communication mode; and
   transmitting data over the PC5 communication interface without using the security protection.

10. An apparatus, comprising:
    a transceiver configured to receive first security protection information from a first terminal device via a PC5 communication interface between the first terminal device and a second terminal device, wherein the apparatus is the second terminal device or a chip in the second terminal device; and
    one or more processors coupled to the transceiver and configured to:
      set, based on the first security protection information of the first terminal device indicating that security protection is not needed and second security protection information of the second terminal device indicating that the security protection is not needed, a configuration of user plane confidentiality protection corresponding to the PC5 communication interface to off; and
      send, to the first terminal device, a message comprising the configuration of user plane confidentiality protection corresponding to the PC5 communication interface, wherein the message indicates that the configuration of user plane confidentiality protection is set to off.

11. The apparatus of claim 10, wherein the transceiver is further configured to receive an application identifier from the first terminal device, and wherein the one or more processors are further configured to determine the second security protection information based on the application identifier.

12. The apparatus of claim 10, wherein the transceiver is further configured to receive a service identifier from the first terminal device, and wherein the one or more processors are further configured to determine the second security protection information based on the service identifier.

13. The apparatus of claim 10, wherein after receiving the first security protection information, the one or more processors are further configured to determine, based on the first security protection information of the first terminal device and the second security protection information of the second terminal device, the configuration of the user plane confidentiality protection corresponding to the PC5 communication interface.

14. The apparatus of claim 10, wherein the first security protection information of the first terminal device comprises a first security protection mode, and wherein the second security protection information of the second terminal device comprises a second security protection mode.

15. The apparatus of claim 10, wherein the first security protection information of the first terminal device comprises a first user plane security policy, and wherein the second security protection information of the second terminal device comprises a second user plane security policy.

16. The apparatus of claim 10, wherein the one or more processors are further configured to obtain, from locally stored information, the second security protection information of the second terminal device.

17. The apparatus of claim 10, wherein the one or more processors are further configured to obtain, from an application server, the second security protection information of the second terminal device.

18. A non-transitory computer storage medium configured to store a computer program that, when executed by one or more processors of an apparatus, causes the one or more processors to implement a method comprising:

receiving, by the apparatus, first security protection information from a first terminal device via a PC5 communication interface between the first terminal device and a second terminal device, wherein the apparatus is the second terminal device or a chip in the second terminal device;

setting, by the apparatus and based on the first security protection information of the first terminal device indicating that security protection is not needed and second security protection information of the second terminal device indicating that the security protection is not needed, a configuration of user plane confidentiality protection corresponding to the PC5 communication interface to off; and sending, by the apparatus and to the first terminal device, a message comprising the configuration of user plane confidentiality protection corresponding to the PC5 communication interface, wherein the message indicates that the configuration of user plane confidentiality protection is set to off.

19. The non-transitory computer storage medium of claim 18, wherein the one or more processors are further configured to execute the computer program to:

receive, by the apparatus, an application identifier from the first terminal device; and determine, by the apparatus, the second security protection information based on the application identifier.

20. The non-transitory computer storage medium of claim 18, wherein the one or more processors are further configured to execute the computer program to:

receive, by the apparatus, a service identifier from the first terminal device; and determine, by the apparatus, the second security protection information based on the service identifier.

* * * * *